(12) United States Patent
Watson

(10) Patent No.: US 6,414,455 B1
(45) Date of Patent: Jul. 2, 2002

(54) SYSTEM AND METHOD FOR VARIABLE DRIVE PUMP CONTROL

(76) Inventor: Alvin J. Watson, 2101 Rhonda Ter., Anderson, NV (US) 89014

( * ) Notice: Subject to any disclaimer, the term of this patent is extended or adjusted under 35 U.S.C. 154(b) by 0 days.

(21) Appl. No.: 09/542,032

(22) Filed: Apr. 3, 2000

(51) Int. Cl.[7] ............................................. H02P 7/00

(52) U.S. Cl. ...................... 318/432; 318/433; 388/904; 417/18; 417/22

(58) Field of Search ............................ 318/432, 433; 388/904; 417/42, 18

(56) References Cited

U.S. PATENT DOCUMENTS

| | | | |
|---|---|---|---|
| 4,047,083 A | * 9/1977 | Plunkett | 318/231 |
| 4,249,120 A | * 2/1981 | Earle | 318/729 |
| 4,661,751 A | * 4/1987 | Werner | 318/332 |
| 4,785,225 A | * 11/1988 | Horie et al. | 318/811 |
| 5,272,429 A | * 12/1993 | Lipo et al. | 318/808 |
| 5,710,500 A | * 1/1998 | Matsuo et al. | 318/799 |
| 6,154,002 A | * 11/2000 | Izumisawa et al. | 318/721 |

* cited by examiner

*Primary Examiner*—Khanh Dang
*Assistant Examiner*—Rita Leykin
(74) *Attorney, Agent, or Firm*—Boyle Fredrickson Newholm Stein & Gratz S.C.

(57) ABSTRACT

A pump control system and method employs a variable drive for controlling the speed of an AC electric motor driving a cyclic load. A real-time tuning of the frequency and voltage of the AC input to the motor allows a controlled variation of a cycle speed of the cyclic load. The control system and method adjusts motor speed according to a desired motor speed characteristic for different portions of a complete cycle and over multiple cycles of the cyclic load. The variable drive rectifies a poly-phase AC power input to provide a source of DC power on a DC bus and periodically samples the DC bus current and DC bus voltage across the DC bus to optimize the motor operation. A preselected voltage-frequency profile and a set of motor parameters including a torque set point or a torque range consistent with the desired motor speed characteristic derived from a motor load profile for different portions of a cycle of the cyclic load are provided to the variable drive to substantially minimize regeneration, mechanical loading, energy consumption and maximize production and operational efficiencies. To control the motor speed, synthesized AC motor drive signals are fed to the motor at the appropriate frequency and voltage required to increase or decrease motor speeds consistent with the desired motor speed characteristic during the different portions of the cycle of the cyclic load to significantly reduce energy requirements of the pump control system.

25 Claims, 11 Drawing Sheets

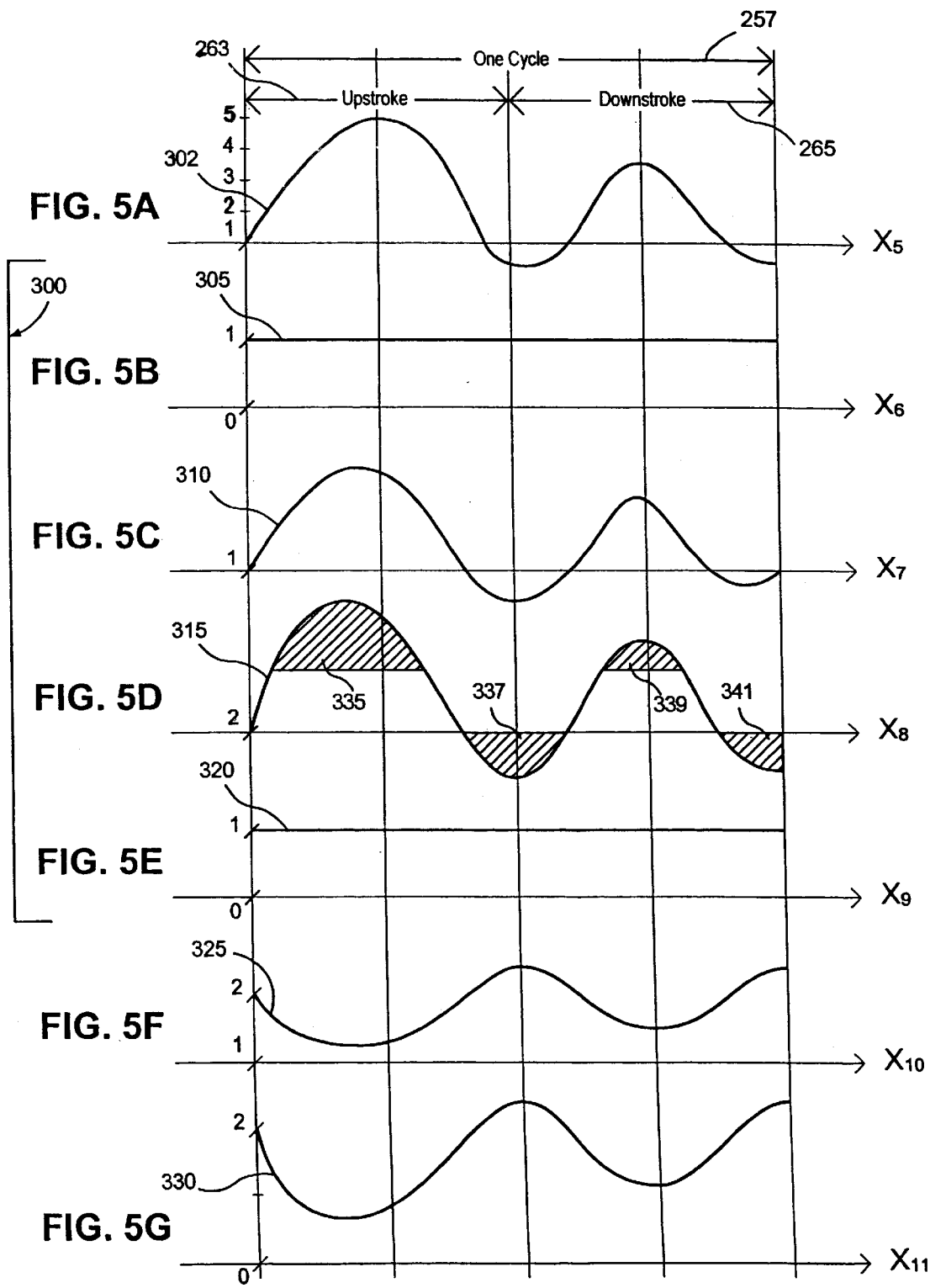

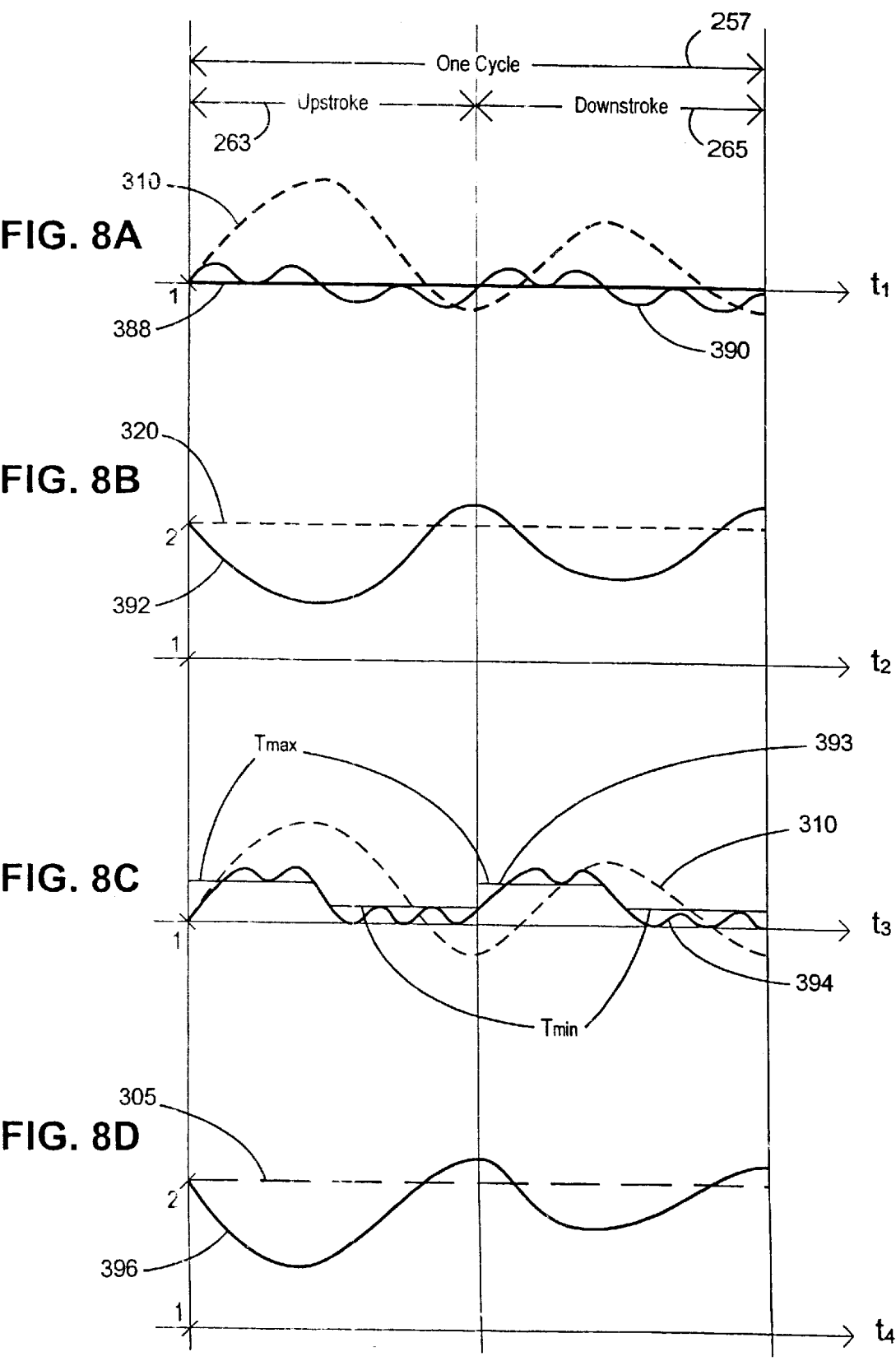

SYSTEM AND METHOD FOR VARIABLE DRIVE PUMP CONTROL

BACKGROUND OF THE INVENTION

A variety of techniques are known for pump control and power management in petroleum well pumping systems. Typically, land-based pumping systems comprise a beam pump, an electric motor, a plunger and a barrel. Such beam pump units are known in the petroleum industry as "pump jacks" or "rod pumps." Generally, these pumps are driven by AC electric motors.

A variety of techniques have been devised to regulate the speed of the beam pump unit to match the fluid accumulation in the well. For example, some pump speed control systems employ what is known as 'damper regulation' or 'throttling.' In damper regulation, the motor runs at a fixed speed, but works against a restriction. This results in relatively high energy consumption. In such constant speed systems, high torques are encountered on startup, the upstroke and the downstroke of a pump stroke cycle.

Alternatively, magnetic couplings, known as eddy current drives, are employed to vary the speed of the beam pump unit to match the oil well's production capabilities. Eddy currents "slip" a magnetic clutch to vary the speed of the pump. Clutch slip is inefficient, generates excessive heat in the clutch, and results in loss of energy. Further, eddy current drives can only slow, and not increase the speed of the beam pump.

Another issue in beam pump motor management is "pump-off." While under extraction, the oil well can eventually pump off causing the plunger to "pound" the fluid in the barrel. To eliminate pounding, simple pump off controllers are installed to stop and restart the pump after a predetermined amount of time. In general, pump off controllers prevent damage to the system, but do not decrease mechanical loading. Consequently, they offer insignificant savings in energy usage.

Many attempts have been made to use variable speed drives to control the motor that drives the beam pump units. Such attempts have met with limited success. Variable drives, and the loads they are applied to, can generally be divided into two broad categories: "constant torque" and "variable torque."

Even though called "constant torque," the term "constant torque" is not literally accurate. The torque actually required can vary significantly. For example, "constant torque" applications frequently experience overload conditions with high torque demands. As a result, "constant torque" variable drives typically have a high overload rating (for example, 150% for 60 seconds) to handle the high peak torque demands. To handle these high torque excursions, excess horsepower is required. Consequently, additional energy is consumed during peak torque periods. This excess energy is wasted when torque demands are low. Thus, the beam pump unit is energy inefficient.

In another type of drive, known as a "constant speed" variable drive, the driving motor is driven at a desired constant speed. As with constant torque applications, constant speed drives have irregular energy usage characteristics. During a typical cycle of a cyclic load including startup, as well as parts of the upstroke and downstroke, constant speed drives require significant energy. They are particularly energy inefficient when in "regeneration" mode.

Regeneration is caused when the load "over speeds" the electric motor. This transforms the motor into a generator that generates excessive energy that returns to the variable drive. Generally, variable drives are not designed to absorb electrical energy from the motor. To handle the regenerated power, power dissipation devices such as resistors are employed. Use of resistors to consume regenerative power is very energy inefficient. There are, however, what are known as regenerative variable drives. Such drives are, however, generally expensive and do not reduce energy consumption.

Consequently, there in a need for a system and method for an energy efficient and cost effective way to control a motor driving a variable cyclic load.

SUMMARY OF THE INVENTION

A system and method for controlling the speed of an electric motor that drives a cyclic load is provided. In one embodiment, the system includes a signal conversion circuit, a signal measurement circuit, a control circuit, a signal inversion circuit and, optionally, a user interface circuit. The signal conversion circuit converts an AC electric signal to a DC electric signal. The signal measurement circuit periodically samples the DC electric signal to derive a DC electric characteristic signal from the DC electric signal. The control circuit receives the DC electric characteristic signal from the signal measurement circuit and derives and stores a DC current signal from the set of DC electric characteristic signals. The control circuit is responsive to the DC electric characteristic signal and a set of provided or derived operational parameters which may include, for example, a voltage-frequency profile and a set point parameter to generate a set of control signals. The signal inversion circuit, responsive to the set of control signals, inverts the DC electric signal and generates a set of drive signals to modify the speed of the motor through changes in supplied frequency or voltage. By modifying the motor speed, the system and method controls and regulates the motor attributes of speed and torque to selectively operate the motor either in a regulated "constant torque" mode or in a regulated "constant speed" mode.

In the regulated "constant torque" mode, in response to a set point parameter provided as a torque set point, the control circuit derives a set of torque reference signals. The control circuit compares the received set of DC electric characteristic signals and the stored DC current signal with the set of torque reference signals to generate a set of control signals. The control signals are representative of a determined selective adjustment to the frequency and voltage of the set of the drive signals. The signal inversion circuit generates a corresponding set of variable frequency and variable voltage drive signals and applies the set of variable frequency and variable voltage drive signals to selectively drive the motor at increased or decreased speeds by incrementing or decrementing the frequency of the set of drive signals. In alternative modes, the voltage of the drive signals may be modified.

In the regulated "constant speed" mode, in response to the set point parameter provided as a set point target torque range for a selected motor speed, the control circuit derives a set of speed reference signals. The control circuit compares the received set of DC electric characteristic signals and the stored DC current signal with the set of speed reference signals to generate the set of control signals. The control signals are representative of the selective adjustment to the frequency and voltage of the set of the drive signals. The signal inversion circuit generates a set of variable frequency and variable voltage drive signals and applies the set of variable frequency and variable voltage drive signals to selectively drive the motor at increased or decreased speeds by incrementing or decrementing the frequency of the set of drive signals according to the set point target torque range for the selected motor speed.

The optional user interface circuit is a supplied method to provide the control circuit with the set of operational parameters such as a voltage-frequency profile, and set point parameter appropriate for either the regulated "constant torque" or regulated "constant speed" mode. The set point parameter represents a motor control characteristic. The motor control characteristic may be provided to the system or derived from a motor load profile that typifies a set of characteristics of the motor under control. The motor load profile may be determined in the system by driving the motor through a complete cycle of the cyclic load.

The motor load profile may optionally be derived using a load sensor and a speed sensor. The motor may be operated at a selected motor torque to obtain a variable motor speed characteristic in the unregulated "constant torque" domain. The motor may also be operated at a selected motor speed to obtain a variable motor torque characteristic in the unregulated "constant speed" domain. The variable motor control characteristics are preferably derived as the motor runs through the cycle of the cyclic load and the load sensor and speed sensor generate data representative of the characteristics of the unregulated motor under loading conditions.

BRIEF DESCRIPTION OF THE DRAWINGS

FIG. 5A depicts a varying load curve for a motor driving the cyclic load of FIG. 4D.

FIG. 5B depicts a constant motor speed curve of an exemplar motor load profile for a motor driving a cyclic load in "constant speed" mode.

FIG. 5C illustrates a variable motor torque curve associated with the constant motor speed curve of FIG. 5B.

FIG. 5D depicts a proportionate horsepower curve corresponding to the constant motor speed curve of FIG. 5B and the variable motor torque of FIG. 5C.

FIG. 5E depicts a constant motor torque curve of an exemplar motor load profile for a motor driving a cyclic load in "constant torque" mode.

FIG. 5F exemplifies a desired variable motor speed characteristic shown as a variable motor speed curve for the exemplar motor load profile of a motor driving a cyclic load in "constant speed" or "constant torque" mode.

FIG. 5G depicts a desired horsepower curve corresponding to the constant motor torque curve of FIG. 5E and the desired variable motor speed characteristic of FIG. 5F.

FIG. 8A depicts an exemplary set of motor torque curves in a "constant torque" mode for a torque set point, Tref, of a motor driving the cyclic load through an upstroke and a downstroke of the pump stroke cycle in a beam pumping-unit.

FIG. 8B depicts the preselected constant motor torque curve of FIG. 5E and an adjusted speed curve according to the adjusted torque curve of FIG. 8A.

FIG. 8C depicts an exemplary set of motor torque curves in "constant speed" mode for a set point target torque range (Tmin, Tax) of a motor driving the cyclic load through an upstroke and a downstroke of the pump stroke cycle in the beam pumping-unit of FIG. 3.

FIG. 8D depicts the preselected constant motor speed curve of FIG. 5B and an adjusted speed curve according to the adjusted torque curve of FIG. 8C.

DETAILED DESCRIPTION OF PREFERRED EMBODIMENTS

For clarity of the present exposition, an exemplary beam pumping unit under control of a motor operated in accordance with the present invention is illustrated. Those skilled in the art will appreciate that the described system and method for controlling the speed of an electric motor under a cyclic load is adaptable to a variety of configurations and applications and may be devised to include many other types of pumps, motors and loads. For example, the present invention may be embodied in both single phase and poly-phase motors and to other motor-driven cyclic loads including other types of frictional and inertial loads.

Figure 1:
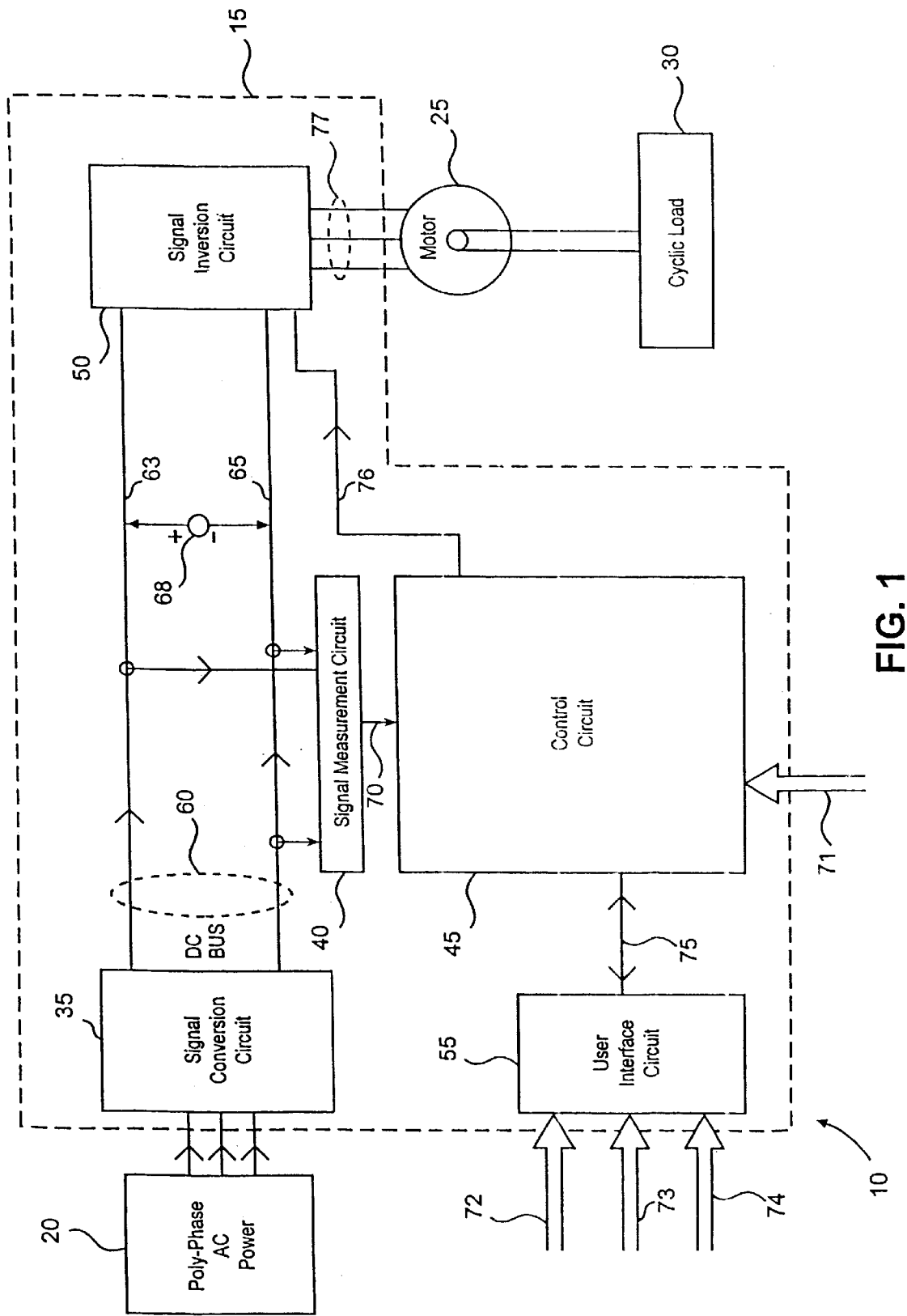
FIG. 1 is a block diagram of a preferred embodiment of a motor drive control system devised in accordance with the present invention.

FIG. 1 is a block diagram of a preferred embodiment of the present invention. Motor drive control system 10 comprises a variable drive system (VDS) 15 coupled to a poly-phase AC power source 20. VDS 15 controls a poly-phase AC electric motor 25 driving a cyclic load 30. Control system 10 includes a set of interconnected signal processing circuits that may be configured within VDS 15 drive package.

As depicted in FIG. 1, VDS 15 includes a signal conversion circuit 35, a signal measurement circuit 40, a control circuit 45, a signal inversion circuit 50, and, optionally, a user interface circuit 55. The signal conversion circuit 35 coupled to a poly-phase AC power source 20 converts an AC electric signal from the AC power source 20 to provide a DC electric signal on a DC bus 60 depicted as signal lines 63 and 65. Persons skilled in the art are familiar with particular circuitry that could be devised to perform the functions described here.

Signal measurement circuit 40 electrically connected to control circuit 45 periodically samples the DC electric signal to derive one or more DC electric characteristic signals 70. Preferably, DC electric characteristic signals 70 include current on signal line 65 as a DC bus current signal, Idc, and the potential difference 68 across DC bus 60 as a DC bus voltage signal, Vdc. As those in the field will note, Idc would be indicative of the actual torque required to drive load 25 at any sampled time. An operational parameter set is either loaded into ROM or flash memory or other nonvolatile memory (as represented by input reference arrow 71) on board control circuit 45 or provided through optional user interface circuit 55. Operational parameter set 71 is shown as being supplied to control circuit 45 through interface 55 by reference arrow 71. Although other or fewer components will operate in the scope of the invention, the preferred constituents of operational parameter set 71 include voltage-frequency profile 72, a set of motor characteristics 73 and a set point parameter 74.

Set point parameter 74, either a torque set point or range, represents a motor control characteristic. Set point parameter 74 may be a torque set point or a torque set point range depending upon whether the system is operating in a "constant torque" or "constant speed" mode, respectively.

The motor control characteristic may be optionally derived from a particular motor load profile. A motor load profile includes a set of motor characteristics for operation in an unregulated "constant speed" mode and/or an unregulated "constant torque" mode. The motor load profile is determined for a varying motor load encountered by motor 25 while driving cyclic load 30 through a complete cycle. The profiles and parameters may be preloaded, input through an interface, or derived from the system.

A useful motor load profile in the unregulated "constant speed" mode may be obtained by operating motor 25 at a selected motor speed to identify a corresponding variable motor torque characteristic or, alternatively or, in addition, in the unregulated "constant torque" mode at a selected motor torque to derive an associated variable motor speed characteristic for different portions of the cycle of the cyclic load 30.

Motor drive control system 10 modifies the speed of motor 25 different portions of a single cycle or may, in addition, control the speed of motor 25 over a number of complete cycles of cyclic load 30. Control system 10 minimizes motor 25 energy use by selectively regulating the motor speed to bring the motor to exhibit either substantially constant torque or constant speed. As those of skill in the art recognize, as constant torque or constant speed are approached across a cycle of a cyclical load, energy consumption of the driving motor is reduced.

In response to parameter set 71 and the set of DC electric characteristic signals 70, control circuit 45 generates a set of control signals 76. The set of control signals 76 comprises a set of frequency control signals and a set of voltage control signals representative of the selective adjustment to the frequency and voltage of a set of motor drive signals 77 of motor 25. In a preferred embodiment, the set of control signals 76 includes a variable duty cycle output waveform.

Signal inversion circuit 50 is electrically coupled between the DC bus 60 and the motor 25 to receive the set of control signals 76 from control circuit 45. In response, inversion circuit 50 generates variable frequency and variable voltage motor drive signals 77. Signal inversion circuit 50, responsive to the set of control signals 76, inverts the DC electric signal to generate the set of motor drive signals 77. Signal inversion circuit 50 selectively applies the set of motor drive signals 77 to drive motor 25 at increased or decreased speeds according to the motor control characteristic at different portions of the complete cycle of cyclic load 30. Signal inversion circuit 50 may be derived in a variety of circuitry configurations but preferably includes solid state switching elements, for generating pulsed power signals at desired, variable frequencies. Variable voltages may also be applied. Isolated gate bipolar transistors (IGBTs) are preferably employed as switching elements for their desirable fast switching speed capability resulting in a higher DC pulse or carrier frequency to minimize motor 25 noise.

In the regulated "constant torque" mode, in response to the set point parameter 74 provided as a torque set point, control circuit 45 derives a set of torque reference signals 80. Control circuit 45 compares the received set of DC electric characteristic signals 70 and a stored DC current signal with the set of torque reference signals 80 to generate the set of control signals 76 representative of the selective adjustment to the frequency and voltage of the set of the drive signals 77. Signal inversion circuit 50 generates a set of variable frequency and variable voltage drive signals 77 which are selectively applied to motor 25 speed to modify Motor 25 speed in accordance with the torque set point objective.

In the regulated "constant speed" mode, in response to the set point target torque range for a selected motor speed, control circuit 45 derives a set of speed reference signals 85. Control circuit 45 compares the received set of DC electric characteristic signals 70 and the stored DC current signal with the set of speed reference signals 85 to generate set of control signals 76 representative of an appropriate selective adjustment to the frequency and voltage of set of the drive signals 77. Signal inversion circuit 50 generates a set of variable frequency and variable voltage drive signals 77 which are selectively supplied to motor 25 to increase or decrease motor speed in accordance with the set point parameter 74 provided in this case as the set point target torque range for the selected motor speed.

In a preferred embodiment of the present invention, the control circuit 45 of system 10 includes a typical control microprocessor and an analog-to-digital converter for receiving and converting analog signals to digital data (for example, motor operational parameter signals and DC electric characteristic signals 70). Preferably, control circuit 45 also includes memory circuits (not shown), such as RAM and ROM for storing data and software machines to operate on the data. Software machines are understood in the art, and execute on the microprocessor and are generally stored in the ROM, while the microprocessor utilizes the RAM to temporarily store intermediate data, which is utilized during the execution of the software machines stored in the ROM. The microprocessor produces real-time digital data at a predetermined sampling interval. The data are representative of the parameter signals and the set of DC electric characteristic signals 70 communicated to the control circuit 45 from circuit 40 during a typical control process cycle sequence of control system 10.

Figure 2:
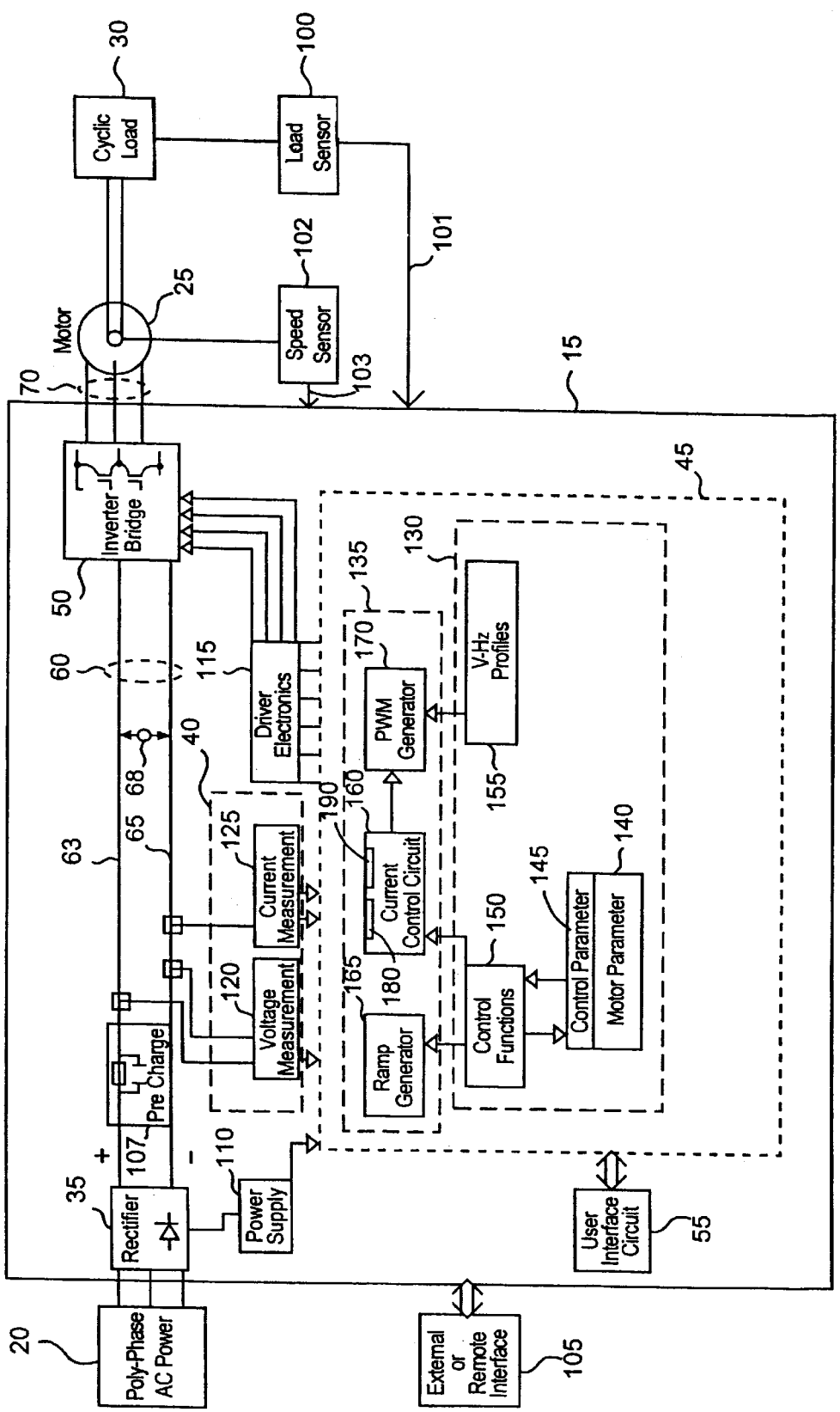
FIG. 2 is an electrical schematic block diagram of the motor drive control system of FIG. 1 for an AC electric motor-driven cyclic load.

FIG. 2 is an electrical schematic block diagram of a preferred embodiment of motor drive control system 10 of FIG. 1. The embodiment of FIG. 2 optionally includes a load sensor 100 to measure the torque of motor 25 and provide a transducer signal 101 to VDS 15. A speed sensor 102 is also optionally connected between motor 25 and VDS 15 to measure the speed of motor 25 and to provide a tachometer signal 103 to VDS 15. Control system 10 may also include remote interface 105 communicatively connected to VDS 15 to administer command signals, such as a start signal, a stop signal, an execution signal from remotely located external sources and provide parameters and profiles.

In addition to the set of interconnected circuits of VDS 15 as illustrated in FIG. 1, additional circuits are depicted in FIG. 2. Preferably, VDS 15 includes a charging circuit 107, a DC power supply 110, and a driver electronics circuit 115. Charging circuit 107 limits DC current Idc on DC bus 60 during power-up. The DC power supply 110 coupled to signal conversion circuit 35 powered from poly-phase AC power source 20 provides DC power to control circuit 45. Control circuit 45 communicates with signal inversion circuit 50 using the driver electronics circuit 115. Signal measuring circuit 40 of VDS 15 comprises a DC voltage monitoring and measuring circuitry 120 and a DC current monitoring and measuring circuitry 125 which periodically sample and determine voltage and current on DC bus 60.

Control circuit 45 of VDS 15 includes a memory circuit 130 and a processing circuit 135 to accessibly store and selectively process the set of operational parameters. In a preferred embodiment, the set of motor characteristics 73 includes motor parameters 140, control parameters 145, control functions 150, and voltage-frequency profiles 155 received from the user interface circuit 55, the remote interface 105, or a preload process. In addition to the set of motor characteristics 73, command signals including start, stop, and the execution signals can be provided to control circuit 45 by preloading or from user interface circuit 55 or from remote interface 105.

Processing circuit 135 comprises a current (torque) control circuit 160, a ramp generator 165, and a pulse width modulation (PWM) generator 170. It should be understood that for the clarity of the present exposition these generally known additional circuits are depicted as discrete circuits. However, persons skilled in the art will appreciate that these additional circuits can be appropriately combined and preferably incorporated within an appropriately configured (programmed) VDS 15.

Current control circuit 160 preferably comprises a DC bus current feedback circuit 180 and a DC bus voltage feedback circuit 190. Current feedback circuit 180 and voltage feedback circuit 190 preferably avoid overloading and overcurrent tripping of motor 25 by appropriately monitoring the DC bus current Idc, the voltage Vdc, and the present frequency of operation to prohibit any excursions of voltage and current beyond a set of preset current and voltage limits for motor 25. In addition, control system 10 may include a typical fault signal circuit (not shown) comprising protection circuits for phase-to-phase protection, phase-to-ground short circuit protection, high and low line voltage protection, protection against excessive ambient temperature, and protection against continuous excessive output current. As persons skilled in the art will recognize, any suitable current and voltage limiting and fault signal circuits can be employed for this purpose.

Figure 3:
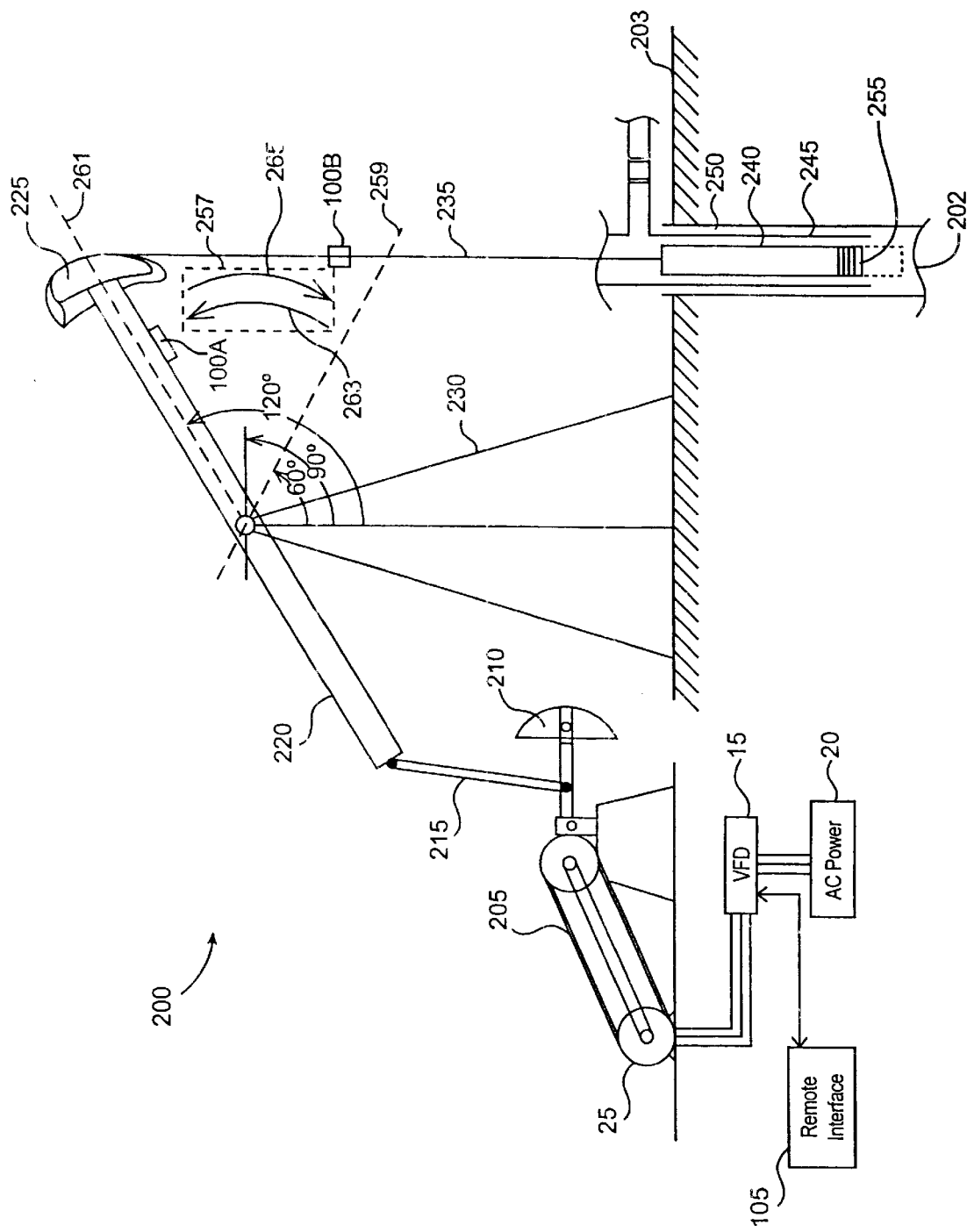
FIG. 3 is a diagram of a beam-pumping unit that illustrates an exemplary application of a motor drive control system devised in accordance with the present invention.

FIG. 3 depicts an exemplary oil well beam-pumping unit 200 to illustrate a typical application of a preferred embodiment of motor drive control system 10 of FIG. 2 devised in accordance with the present invention. Persons skilled in the art will recognize that control system 10 may be employed in a variety of pumping systems with an AC motor-driven cyclic load.

Beam-pumping unit 200 employs motor drive control system 10 to control the speed of poly-phase AC electric motor 25, preferably a three-phase AC electric motor. Beam-pumping unit 200 further includes a load driving system 205 operably connected to a counterweight 210. Counterweight 210 is movably connected to a connecting rod 215, which in turn connects to a walking beam 220 having a horse head 225 on the distal end. Walking beam 220 is movably pivoted on a Samson post 230 to move the rod string 235 in a reciprocating manner. Rod string 235 is attached to a sub-surface plunger 240 that reciprocates upward and downward in a barrel 245, which is connected proximal to the bottom of a tubing string 250. The beam-pumping unit 200 also includes a down hole pump 255 having valves to direct the flow of oil. Either a load sensor 100A on walking beam 220 or a load sensor 100B on rod string 235 may be provided to measure motor 25 torque.

In operation, for extracting subsurface petroleum products from the subsurface reservoir 202 to surface 203, beam-pumping unit 200 typically goes through a complete pump stroke cycle 257 while walking beam 220 traverses once upwards and once downwards from position 259 to position 261. Pump stroke cycle 257 comprises an upstroke 263 and a downstroke 265.

As an example, pump stroke cycle 257 may be 8 seconds long with upstroke 263 and downstroke 265 of duration 4 seconds each (assuming beam-pumping unit 200 is fully balanced). During pump stroke cycle 257, the down hole pump 255 valves selectively open and close to allow oil into the down hole pump 255 and to collect the oil in tubing string 250. When plunger 240 moves upwards during upstroke 263, oil gets displaced in tubing string 250 from top of plunger 240 and concurrently fresh oil from the reservoir 202 is allowed into barrel 245. On downstroke 265, the valve holds the oil in tubing string 250 and fresh oil in barrel 245 gets transferred to the top of plunger 240 to be transported in tubing string 250 during the subsequent upstroke 263. Typically, after numerous operations, tubing string 250 gets filled and the collected oil is moved to surface 203.

Cyclic load 30 typically comprises, therefore, moving parts including load driving system 205, counterweight 210, connecting rod 215, walking beam 220, horse head 225, rod string 235, plunger 240, down hole pump 255, and the oil under extraction. However, there is a significant variation in an effective load imposed on motor 25 during different portions of the pump stroke cycle 257. The oil and rod string 235 must be lifted on upstroke 263, but not on downstroke 265. Only counterweight 210 is the significant part of the effective load on downstroke 265. This varying effective load can be seen as a varying speed and torque requirement for motor 25.

With reference to FIGS. 1 and 2, load sensor 100 and speed sensor 102 are optionally employed to obtain a motor load profile for a particular motor 25 under load. The particular motor load profile identifies variable motor torque and motor speed characteristics in respective, unregulated "constant speed" modes and unregulated "constant torque" modes. Jointly, the motor torque characteristic and the motor speed characteristic indicate the horsepower or energy requirement of motor 25 for different portions of a typical cycle of cyclic load 30 in the unregulated "constant speed" and unregulated "constant torque" modes, respectively. Since the motor torque characteristic for the identified portions of the cycle of the cyclic load 30 is representative of an actual torque required to drive motor 25, a desired torque set point or a desired set point target torque range consistent with a particular motor speed control characteristic may be optionally derived for the particular motor load profile.

To produce the particular motor load profile, in a preferred embodiment of the present invention, an appropriately programmed VDS 15 receives a profile execution signal. In addition, the set of motor characteristics 73 including predetermined motor speed and motor torque parameters for motor 25 are served to VDS 15. From generally known and conventional relationships between a varying load and the corresponding motor torque and speed, a useful motor load profile can be derived by VDS 15. From transducer signal 101 and tachometer signal 103, an appropriate motor load profile may also be derived.

From transducer signal 101, the tachometer signal 103, the profile execution signal, and the predetermined motor speed and torque parameters received from user interface circuit 55, VDS 15 may determine and communicate back to user interface circuit 55 and/or remote interface 105, a desired torque set point or range representative of the motor control characteristic (speed or torque) derived from analysis of motor 25 under load.

FIGS. 4A to 4D depict a typical set of varying load characteristic for beam-pumping unit 200 during different identified portions of upstroke 263 and downstroke 265 within the pump stroke cycle 257. For ease of illustration, only significant contributors to the effective load on motor 25 including counterweight 210, rod string 235, and the oil load are considered. The effective load is the cumulative mechanical load imposed on the motor 25.

Figure 4A:
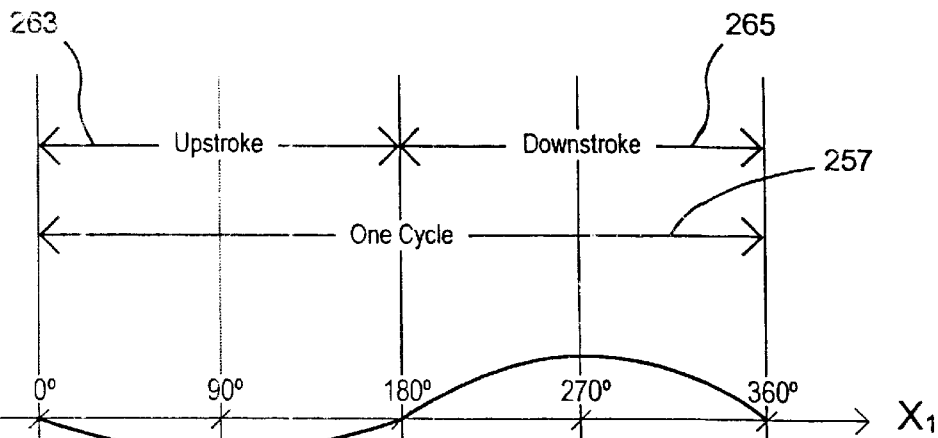
FIG. 4A exemplifies a load curve for a counterweight over a complete pump stroke cycle.

FIG. 4A exemplifies a load curve 275 for counterweight 210 over a complete revolution from 0 to 360 degrees during pump stroke cycle 257. The amplitude of counterweight load curve 275 progressively decreases from 0 to 90 degrees and then progressively increases up to 180 degrees. However, load curve 275 remains below X1-axis throughout upstroke 263, illustrated as the 0 to 180 degree portion of pump stroke cycle 257. As shown, counterweight 210 acts as a negative load on motor 25 during upstroke 263.

In downstroke 265, extending from 180 to 360 degrees, load curve 275 has a relatively higher peak and positive amplitude relative to the lowest amplitude level of upstroke 263 portion of the load curve 275. Load curve 275 increases from 180 to 270 degrees and subsequently decreases between 270 to 360 degrees. Counterweight 210 is generally the relevant effective load on motor 25 during downstroke 265, illustrated as the portion of pump stroke cycle 257 from 180 to 360 degrees.

Figure 4B:
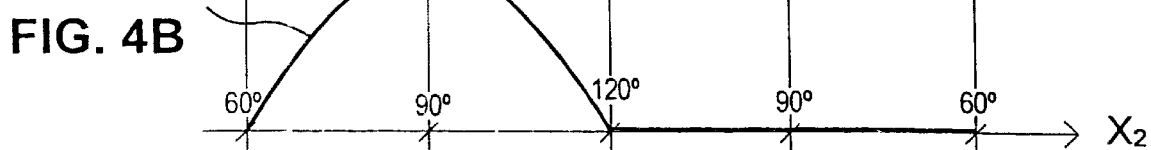
FIG. 4B depicts a load curve for a rod string over a complete up and down reciprocating motion of a walking beam in the pump stroke cycle.

FIG. 4B depicts a load curve 280 for rod string 235 over a complete up and down reciprocating motion of walking beam 220 from position 259 to position 261 as shown in FIG. 3. The amplitude of rod string load curve 280 increases from 60 to 120 degrees and afterward, progressively decreases to 120 degrees. Load curve 280 remains above X2-axis throughout upstroke 263, illustrated as the portion of pump stroke cycle 257 from 60 to 120 degrees. Rod string 235 is generally the most significant part of the effective load on motor 25 during upstroke 263. While in downstroke 265 from 120 to 60 degrees, load curve 280 has normally no significant amplitude indicating practically no contribution from the rod string 235.

Figure 4C:
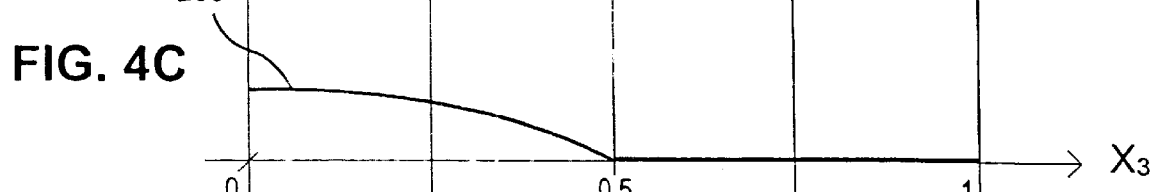
FIG. 4C illustrates a load curve for a typical oil load lifted during the pump stroke cycle.

FIG. 4C illustrates a load curve 285 for a typical oil load handled during pump stroke cycle 257. The amplitude of oil load curve 285 decreases from maximum to zero from beginning to end of upstroke 263. Load curve 285 remains above X3-axis throughout upstroke 263, illustrated as the portion of pump stroke cycle 257 from 0 to 0.5. Oil load generally plays a part in the approximation of the effective load on motor 25 during upstroke 263 only. Therefore, in downstroke 265, represented from 0.5 to 1, load curve 285 indicates no significant amplitude.

Figure 4D:
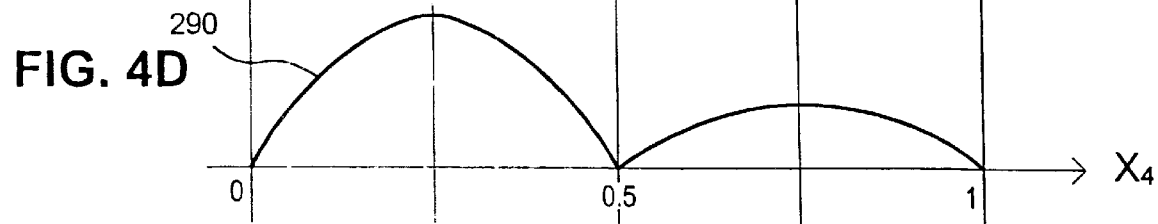
FIG. 4D illustrates an effective load curve for a cyclic load as the cumulative mechanical load imposed on a motor during different portions of the pump stroke cycle.

FIG. 4D illustrates the cumulative mechanical load imposed on motor 25 during different portions of pump stroke cycle 257. In upstroke 263, load curve 290 amplitude increases until walking beam 220 reaches the 90 degree angular position. Thereafter, amplitude decreases through the rest of upstroke 263. Similarly, the effective load amplitude of load curve 290 increases until walking beam 220 reaches the 90 degree angular position. Thereafter, amplitude decreases through the rest of the downstroke 265. Although load curve 290 amplitude remains positive, that is, above X4-axis throughout pump stroke cycle 257, the maximum effective load amplitude in downstroke 265 is typically less than half of the amplitude in upstroke 263. The significant variation in effective load across different identified portions of upstroke 263 and downstroke 265 of pump stroke cycle 257 can lead to motor inefficiencies.

To determine an appropriate motor speed control characteristic for motor 25 through pump stroke cycle 257, a particular motor load profile is derived to recognize various effects of over-loading or under-loading motor 25 by the amplitude variation of the effective load. The amplitude variation of effective load curve 290 represents the cumulative varying motor load. Because the effective load is the work required of motor 25 to drive the attached cyclic load 30, it can be suitably expressed in horsepower or torque at a certain motor speed.

FIG. 5A depicts a varying load curve 302 for motor 25 driving cyclic load 30 according to the effective load curve 290 depicted in FIG. 4D. The varying load curve 302 is derived from effective load curve 290.

FIGS. 5B to 5E depict exemplar motor load profiles for motor 25 driving cyclic load 30 through upstroke 263 and downstroke 265 of pump stroke cycle 257 in beam pumping-unit 200. For ease of understanding, the depicted exemplar motor load profiles are preferably normalized and appropriately scaled.

Motor load profile 300 is a constellation of attributes of motor 25 and is depicted by FIGS. 5B, 5C, 5D and 5E. Motor load profile 300 comprises a preselected motor speed curve 305, associated variable motor torque curve 310, proportionate horsepower curve 315 for an unregulated "constant speed" motor operation, and a predetermined constant motor torque curve 320 for an unregulated "constant torque" motor operation.

Using the unregulated motor torque and speed behavior of motor 25 at "constant speed" and "constant torque," a desired motor speed control curve 325 is derived to compensate for the substantial variation in motor torque and speed for the "constant speed" and "constant torque" motor operations, respectively. A corresponding horsepower or energy requirement is depicted in horsepower curve 330.

Load curve 302 of FIG. 5A shows changes in peak torque demands and motor speed fluctuations when the exhibited motor load significantly increases or decreases. Exemplar motor load profile 300 is preferably obtained from operating motor 25 at the preselected constant motor speed represented by constant motor speed curve 305 of FIG. 5B. The corresponding variable motor torque characteristic indicated by varying motor torque curve 310 of FIG. 5C and horsepower curve 315 of FIG. 5D can then be obtained. By operating motor 25 at the predetermined motor torque depicted as constant motor torque curve 320 of FIG. 5E, a corresponding motor speed characteristic approximately similar to motor torque curve 310 may be obtained.

Thereafter, the appropriate motor speed control characteristic shown as variable motor speed curve 325 of FIG. 5F may be identified for different portions of pump stroke cycle 257 of the cyclic load 30. FIG. 5G depicts a corresponding horsepower curve 330 according to the appropriate motor speed control characteristic of variable motor speed curve 325 of FIG. 5F. Nevertheless, once the exemplar motor load profile 300 is determined or identified, an appropriate motor speed control characteristic and, subsequently, the desired torque set point or range may be derived. The exemplar motor load profile 300 identified from load sensor 100 and speed sensor 102 optionally provides a reasonable starting point to drive motor 25. VDS 15 can operate without further need of load sensor 100 and speed sensor 102 for operation of beam-pumping unit 200.

Motor load profile 300 of beam pumping unit 200 provides an insight regarding large differences between the peak and the average torque required and fluctuations in motor speed. Consequently, an appropriate motor speed control characteristic can be contemplated from exemplar motor load profile 300 to derive a desired torque set point or range which may be adhered to by manipulating the speed of motor 25. This appropriate motor speed control can provide substantial savings in the energy cost by minimizing energy usage by motor 25.

For example, in FIG. 5D, hatched areas 335, 337, 339, and 341 illustrate extra energy consumed by motor 25 in unregulated "constant speed" and unregulated "constant torque" mode operations. For example, hatched area 335 illustrates that during upstroke 263 as torque demands peak, to maintain a "constant speed" mode operation, motor 25 requires additional horsepower. In the unregulated "constant speed" mode operation, to meet such a demand for the additional horsepower, motor torque is allowed to increase without restriction as indicated in curve 310. Peak torque demand during downstroke 265 is significantly lower as illustrated in FIG. 5C. Consequently, the additional horsepower of hatched area 335 results in regeneration by transforming motor 25 into a generator. Such additional horsepower of hatched area 335 is typically lost during downstroke 265 in the unregulated "constant speed" mode operation. In contrast, in the regulated "constant speed" mode of operation, the unchecked excursion of torque is substantially avoided by use of a torque set point as a basis for control.

Three-phase AC motors are typically comprised of two major components, the stator and the rotor. The stator is a set of three electrical windings held stationary in the motor housing. The rotor is a metal cylinder, fixed to the motor drive shaft, which rotates within the stator. The arrangement of the stator coils and the presence of three-phase AC voltage give rise to a rotating magnetic field that drives the rotor. The speed at which the magnetic field rotates is known as the synchronous speed of the motor (motor speed). Synchronous speed or motor speed is a function of the frequency at which the input AC voltage is alternating and the number of poles in the stator windings. The following equation 1 gives the relation between synchronous speed, frequency, and the number of poles in a motor-driven by three phase AC:

$$Ss=120f/p \tag{1}$$

Where: Ss=Synchronous speed (rpm), f=frequency (Hz), and p=number of poles.

The strength of the magnetic field in the gap between the rotor and stator is proportional to the amplitude of the voltage at a given frequency. When motor 25 is loaded with cyclic load 30, it will generally develop torque as it tries to retain its synchronous speed with the magnetic field. The output torque capability of motor 25 is, therefore, a function of the applied voltage amplitude at a given frequency.

Figure 6:
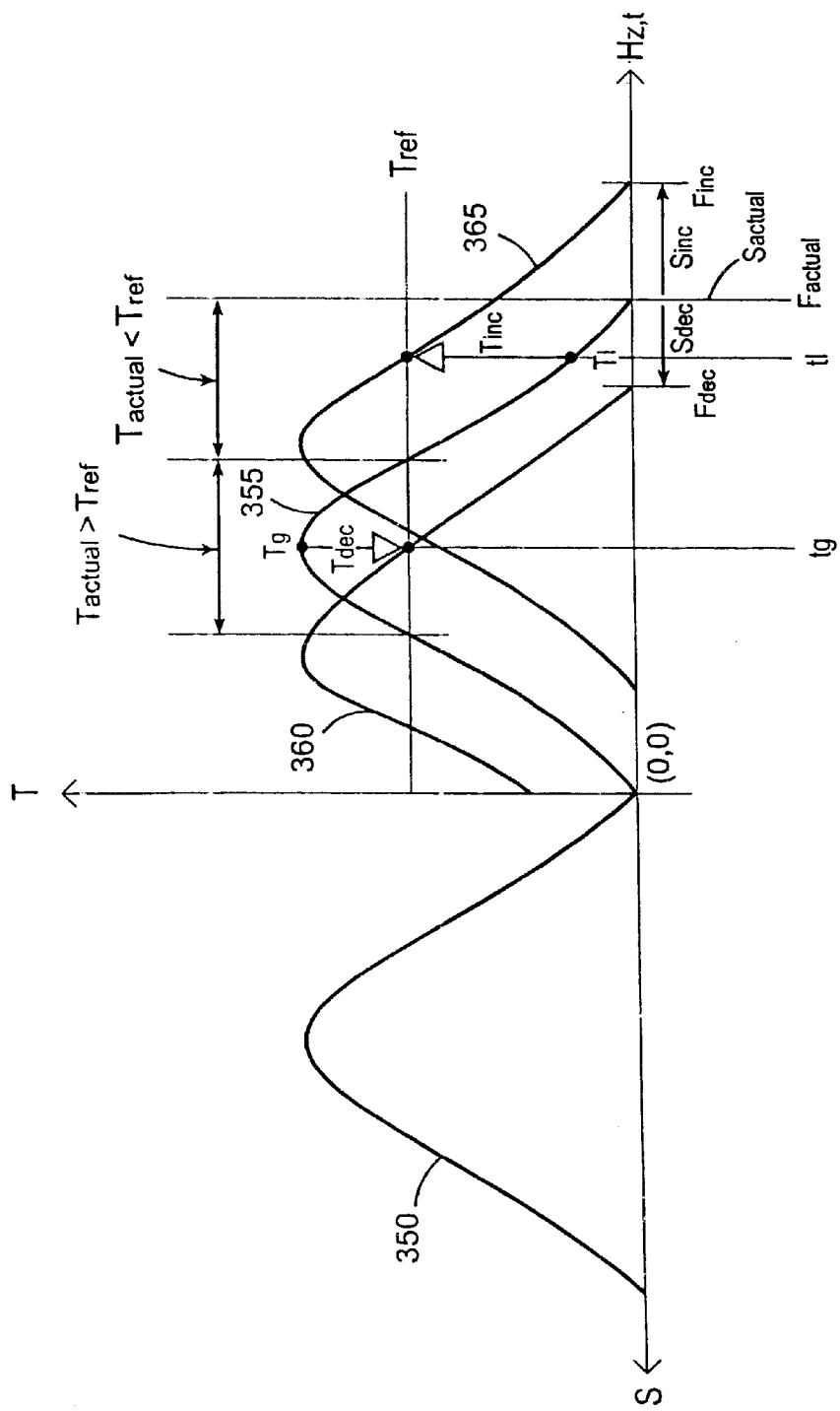
FIG. 6 depicts a typical motor torque-speed curve and illustrates the positioning of the typical motor torque-speed curve along a frequency-time-axis for decreasing or increasing motor speeds in a "constant torque" mode.

FIG. 6 depicts a typical motor torque-speed curve 350 and illustrates the positioning of the typical motor torque-speed curve 350 along a frequency-time-axis, at three different sets of motor drive signals 77. Motor drive signals 77 express frequencies (Factual, Fdec, and Finc) for decreasing or increasing motor speeds at a constant V/Hz ratio while operating motor 25 in motor 25 a regulated "constant torque" mode. The typical motor torque-speed curve 350 can optionally be obtained from the motor 25 when it is not operated either in the regulated or unregulated "constant torque" or the regulated or unregulated "constant speed" mode of operation.

In depicted FIG. 6, frequency Factual represents a sample point in time t. Frequency Finc represents increased frequency and frequency Fdec represents decreased frequency. For a torque set point, Tref, as the desired "constant torque," when a sampled actual torque Tactual=Tg at time tg is found to be less than Tref, to maintain "constant torque," the sensed torque curve 355 is moved to position 360. Motor speed is decreased from Sactual by an amount Sdec in response to the frequency decrement from Factual to Fdec of the set of motor drive signals 77.

When a sampled actual torque Tactual=T1 at time t1 is found to be greater than Tref, to maintain the "constant torque," the sensed torque curve 355 is moved to position 365. Again "constant torque" may be maintained by increasing motor speed from Sactual by an amount Sinc in response to the frequency increment from Factual to Finc of the set of motor drive signals 77.

Accordingly, FIG. 6 illustrates that the amplitude of the motor-speed torque curve 350 can remain constant at Tref for all three frequencies of the set of motor drive signals 77 (assuming that the V/Hz ratio is the same at each of the three frequencies.) For example, if motor 25 was operating at 400 volts at 50 Hz, the voltage must be increased to 480 volts when the frequency is increased to 60 Hz (400 volts×60 Hz/50 Hz=480 volts).

Therefore, motor 25 can be operated at a desired "constant torque" Tref by manipulating motor speed. Constant torque output is obtained by maintaining a constant ratio between voltage amplitude (volts) and frequency (Hz). For example, for 60 Hz motors rated at 230, 460, and 575 Vac, common values for this V/Hz ratio are 3.83, 7.66, and 9.58 respectively. Operating with these V/Hz ratios generally yields optimum torque capability. Operating at lower ratio value results in lower torque and power capability.

Figures 7A, 7B:
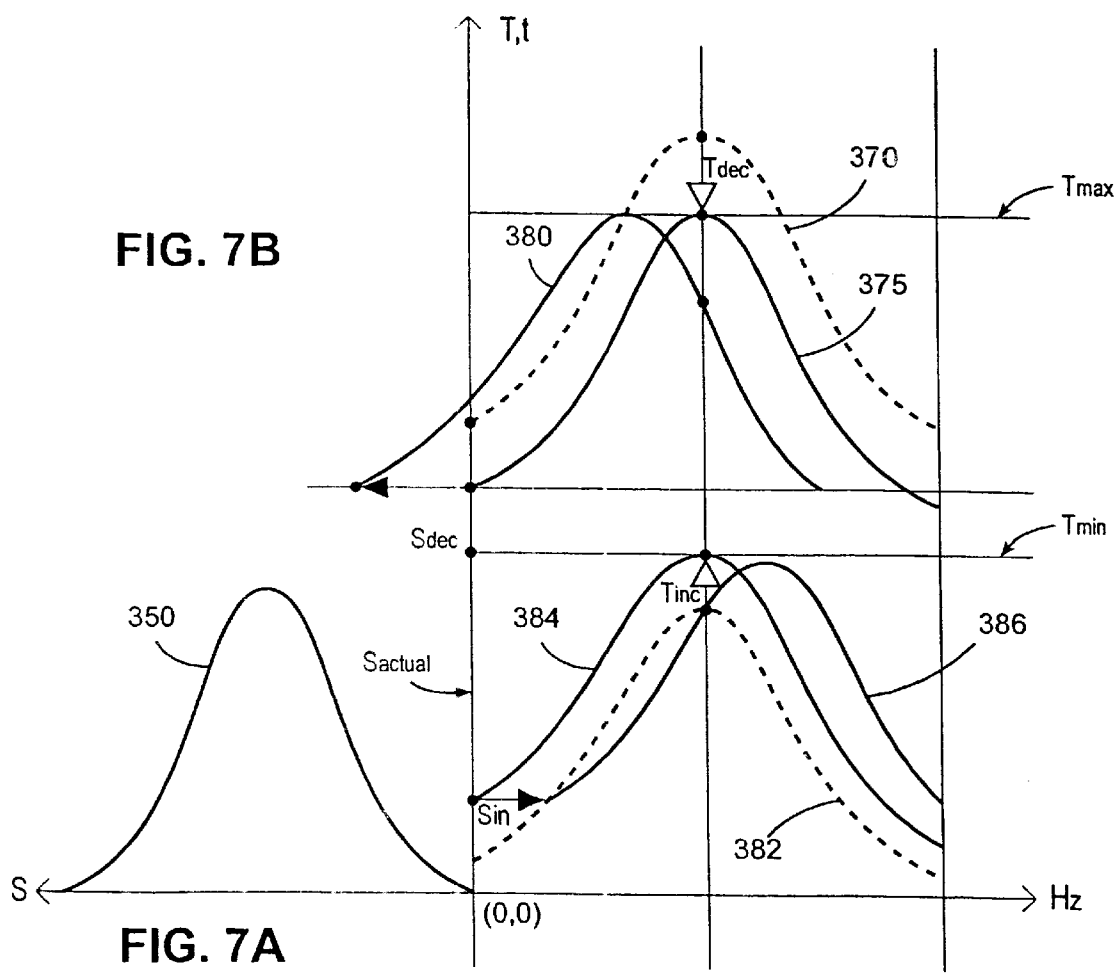
FIG. 7A depicts the typical motor torque-speed curve and illustrates the positioning of the motor torque-speed curve along a torque-time-axis for increasing motor torques in the "constant speed" mode.
FIG. 7B illustrates the positioning of the typical motor torque-speed curve along the torque-time-axis for decreasing motor torques in the "constant speed" mode.

FIG. 7A depicts the typical motor torque-speed curve 350 of FIG. 6 and illustrates the positioning of the motor torque-speed curve 350 along a torque-time-axis for increasing motor torques at a constant V/Hz ratio while operating motor 25 in a regulated "constant speed" mode. FIG. 7B illustrates the positioning of the same curve 350 along the torquetime-axis for decreasing motor torques at a constant V/Hz ratio while operating motor 25 in the regulated "constant speed" mode.

With reference to FIGS. 7A and 7B, motor speed can be varied to keep the motor 25 operating point (set target torque range of Tmin, Tmax). By shifting motor torque curve 350 along the torque-time-axis, the regulated "constant speed" mode of operation can be obtained. While motor torque is increasing to maintain "constant speed" operation, motor torque curve 350 can move up to indicate an increased magnitude of torque. For example, the increased torque may be represented as a torque curve 370. However, for the set target torque range, with maximum allowed torque Tmax and minimum allowed torque Tmin, when a sampled actual torque Tactual on torque curve 370 is found to exceed Tmax, the instantaneous desired torque to maintain the "constant speed" operation at that particular time is exemplified by a desired torque curve 375.

To maintain the "constant speed" operation, torque curve 370 may be moved to position 380. This allows for the regulated "constant speed" operation similar to the regulated "constant torque" operation by decreasing motor speed in response to appropriate decrease in the frequency and voltage of the set of motor drive signals 77. Likewise, when a sampled actual torque Tactual on torque curve 382 is found to be less than Tmin, the instantaneous desired torque at that particular time is exemplified by a desired torque curve 384. To maintain the "constant speed" operation, torque curve 382 may be moved to position 386. Again, this allows the regulated "constant speed" operation similar to the regulated "constant torque" operation by increasing motor speed in response to appropriate increase in the frequency and voltage of the set of motor drive signals 77.

FIG. 8A depicts an exemplary set of motor torque curves in the regulated "constant torque" mode for the torque set point, Tref, while motor 25 is driving cyclic load 30 through upstroke 263 and downstroke 265 of pump stroke cycle 257 in beam pumping unit 200. This set of motor torque curves includes the derived motor speed curve 310, a torque set point curve 388 (coincident with the axis), and an adjusted torque curve 390. FIG. 8B depicts the preselected constant motor torque curve 320 of FIG. 5E and an adjusted speed curve 392 according to the adjusted torque curve 390 of FIG. 8A. Adjusted speed curve 392 exemplifies a preferred motor speed characteristic for the regulated "constant torque" mode of operation of motor 25.

To substantially maintain "constant torque," motor 25 speed is regulated to meet rising and falling torque demands. Appropriate adjustment in motor speed is obtained by regulating the frequency and voltage of the set of motor drive signals 77 to progressively increase or decrease the motor speed according to the preferred motor speed characteristic as exemplified by the adjusted speed curve 392. By limiting the motor torque excursions with Tref, the extra supply of torque during the identified portions of the upstroke 263 and downstroke 265 is selectively controlled.

In general, the extra supply of torque is primarily contained in upstroke 263, which is generally the dominant source of regeneration in downstroke 265. Limiting extra torque thereby limits the energy usage of control system 10. Motor 25 can avoid over speeding and, consequently, not transforming itself into a generator. However, as persons skilled in the art will recognize, in a fully balanced beam-pumping unit 200, regeneration in both upstroke 263 and downstroke 265 can be similarly minimized.

FIG. 8C depicts an exemplary set of motor torque curves in regulated "constant speed" mode for the target torque range set point (Tmin, Tmax), while motor 25 is driving cyclic load 30 through upstroke 263 and downstroke 265 of pump stroke cycle 257 in beam pumping unit 200. This set of motor torque curves includes the derived motor torque curve 310, a set point target torque range curve 393, and an adjusted torque curve 394. FIG. 8D depicts the preselected constant motor speed curve 305 of FIG. 5B and an adjusted speed curve 396 according to the adjusted torque curve 394 of FIG. 8C. Adjusted speed curve 396 exemplifies a preferred motor speed characteristic for the regulated "constant speed" mode of operation of motor 25.

In order to substantially maintain the "constant speed" motor operation during different identified portions of pump stroke cycle 257 of cyclic load 30, motor 25 speed is regularly regulated to meet the rising and falling torque demands. The appropriate adjustment in motor speed is obtained by regulating the frequency and voltage of set of motor drive signals 77 to progressively increase or decrease the motor speed consistent with the preferred motor speed characteristic as exemplified by the adjusted speed curve 396. Increasing the voltage of the sinusoidal power applied to motor 25 increases the motor 25 torque. Decreasing the AC input voltage of set of motor drive signals 77 reduces the motor torque. Therefore, by manipulating torque, motor 25 is operated at the desired "constant speed." For example, in beam-pumping unit 200, extra torque generation beyond Tmax and lower torque generation below Tmin is prohibited in a similar fashion to the regulated "constant torque" mode case, thereby preferably minimizing regeneration and subsequent reduction in energy usage of control system 10.

While the motor torque is going up, motor speed is reduced and when torque demand falls, motor speed is appropriately increased. Thereby, consumed horsepower (energy) gets minimized. Horsepower (HP) is a function of torque and speed as shown below in equation 2.

$$HP = f(T \times S)/k \qquad (2)$$

Where: HP=horsepower (746 watts or 550 pounds per foot per second), T=torque (inch-pounds), S=speed (rpm), and k=constant.

Figure 9:
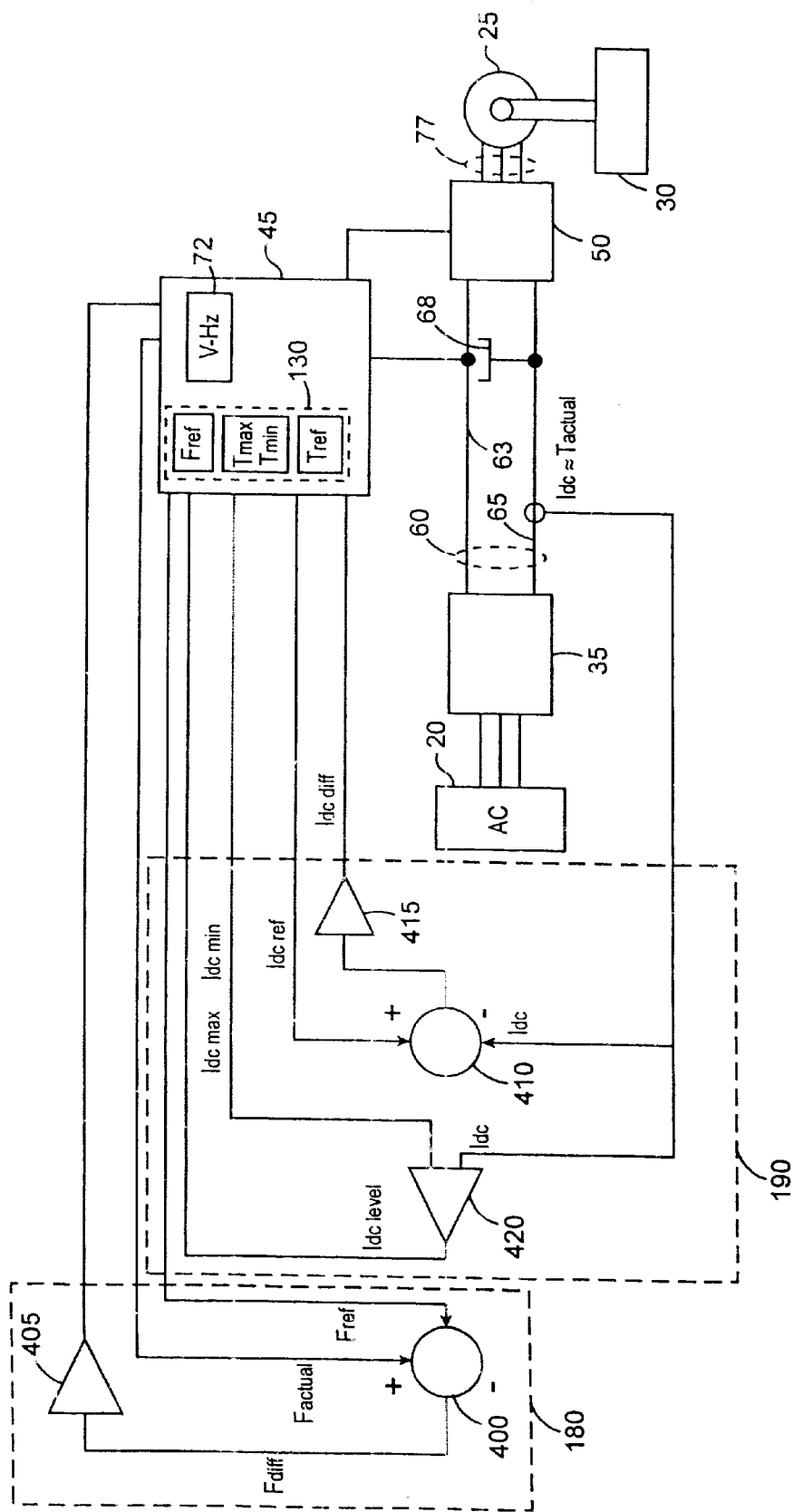
FIG. 9 illustrates a detailed functional schematic of current (torque) control in accordance with an embodiment of the present invention.

FIG. 9 is a schematic of the DC bus current feedback circuit 180 and the DC bus voltage feedback circuit 190 of the current (torque) control circuit 160 of FIG. 2. Current feedback circuit 180 comprises a summation device 400 and an error amplifier 405 to provide a feedback structure for the desired operation of control system 10. The signal, Factual, representing actual frequency, is derived from the measured actual DC bus voltage Vdc across DC bus 60 and from the preselected voltage-frequency profile 72 among voltage-frequency profiles 155. The signal, Factual, is compared by summation device 400 with a predetermined frequency reference signal, Fref. Summation device 400 determines a frequency correction signal, Fdiff, which is the difference between the actual frequency signal, Factual, and the reference frequency signal, Fref. Error amplifier 405 amplifies frequency correction signal, Fdiff, prior to its application to control circuit. Control signals 76 are generated by control circuit 45 to contemplate the frequency correction signal, Fdiff. Accordingly, current feedback circuit 180 is a closed frequency (motor speed) control loop, that goes to generate a relevant set of control signals 76 while driving the frequency correction signal, Fdiff, S towards zero.

Voltage feedback circuit 190 comprises a summation device 410, a control amplifier 415, and a comparison device 420 to provide a control loop feedback structure for the desired operation of control system 10. The signal, Idc, the measured actual DC bus current flowing through DC bus 60, is input to summation device 410 for comparison with a predetermined DC current reference signal, Idcref. Summation device 410 determines a current correction signal, Idcdiff, which is the difference between the actual DC current signal, Idc, and the reference DC current signal, Idcref. The reference current signal, Idcref, represents the torque set point, Tref, for the regulated "constant torque" operation of motor 25. The actual DC current signal, Idc, represents the current drawn by motor 25, which is a function of the instantaneous motor torque applied to drive cyclic load 30. Control amplifier 415 preferably amplifies the DC current difference signal, Idcdiff, prior to its application to control circuit 45. The relevant set of control signals 76 are generated by control circuit 45 to contemplate the DC current difference signal, Idcdiff, and a comparative DC current, Idclevel, derived from comparison of Idc with Idcmax and Idcmin. The maximum and minimum DC currents, Idcmax and Idcmin, represent the respective torque set point range limits for the regulated "constant speed" operation of motor 25. Therefore, voltage feedback circuit 190 comprises a closed current (torque) control loop, which generates the relevant set of control signals 76 while driving the DC current difference signal, Idcdiff, towards zero.

With reference to FIGS. 1 to 9, in a preferred embodiment, control system 10 goes through a control process comprising a startup sequence routine and a predetermined control sequence routine. During the startup programming sequence, prior to operation, by preloading or by using user interface circuit 55 or remote interface 105, the set of motor characteristics 73 related to the motor 25 including rated currents, voltage, frequency, operational times, control mode, and the like are stored in control circuit 45. In a preferred embodiment, the parameter values provided during the startup routine include the base or rated voltage of motor 25 (Vbase), the base or rated frequency of motor 25 (Fbase), the rated full load current of motor 25 (Ilim), and a desired response time for regulating motor speed (tr). During this startup routine, parameter 140, control functions 150 indicating control mode of operation, and parameters for custom voltage-frequency relationships indicated by voltage-frequency profiles 155 are stored in the memory circuit 130. For example, an exemplar voltage-frequency profile along with Vbase and Fbase may be provided as (0 Hz 0V 60 Hz 60V).

In one embodiment, motor parameter 140 and control functions 150 may include "Tref" or "Idcref," "Fref" "Tmin" or "Idemin," "Tmax" or "Idcmax," a start frequency and voltage (Fstart, Vstart) for soft starting at a reduced frequency during setup time "ts," total time for a session run "tt," and control modes (torque mode: TM; base speed mode: BSM; and dual mode: DM, etc.). In case Idcref is directly provided as a DC current magnitude, the conversion from Tref to Idcref is skipped. For example, Idcref can be directly dialed in as 50 amperes. Alternatively, Idcref can be derived from the motor torque, Tref. Optionally, the torque set point, Tref, and the set point target torque range (Tmin, Tmax) may be derived from motor load profile 300 to contemplate a reasonable starting point for the control process. Moreover, even after the initial configuration of control circuit 45, parameters and values input during such startup and control sequence routines may be accessed and modified as desired.

With reference to FIGS. 1 to 9, the predetermined control sequence routine for the control system 10 is described. In operation, using received input signals and characteristic parameter values, control circuit 45 executes the predetermined control sequence routine stored in the memory circuit 130. Based upon the input parameters, control circuit 45 generates reference values. The reference values for the regulated "constant torque" operation include a reference frequency, Fref, and a DC bus reference current, Idcref, representative of the torque set point limit, Tref, if Tref is provided instead of a direct value of Idcref. A DC bus maximum current, Imax, representative of the set point target torque range maximum limit, Tmax, and a DC bus minimum current, Imin, representative of a set point target torque range minimum limit, Tmin, to be used in the regulated "constant speed"operation if Tmax or Tmin are provided instead of direct values of Idcmax or Idcmin. These reference values are communicated to and stored in the memory circuit 130 along with the parameter values provided during the startup sequence.

Thereafter, control circuit 45 iterates through the control sequence for a predetermined period dictated by total time parameter tt while awaiting a command signal from a command device, such as a start switch, to start motor 25. After a start signal is received, control circuit 45 generates in the control sequence routine, a set of relevant control signals based upon the parameters stored during setup and those that are monitored values. These control signals direct signal inversion circuit 50 to output the set of motor drive signals 77 in the form of pulse-width-modulated (PWM) waveforms of an appropriate duty cycle, i.e. at a desired frequency and voltage, to drive motor 25 at the preferred motor speed. To generate the appropriate waveforms, PWM generator 170 employs ramp generator 165 and generally known algorithms. Processing circuit 135 communicates with memory circuit 130 to use the PWM generator 170, ramp generator 165, and the current (torque) control circuit 160 to generate the relevant control signals defining the PWM waveform duty cycle required to obtain the preferred motor speed characteristics. Finally, control circuit 45 applies the relevant control signals to signal inversion circuit 50 to drive motor 25.

Throughout the control process, control circuit 45 generates a number of intermediate values, including the output frequency and the output voltage of the set of motor drive signals 77 applied to motor 25. Response time, tr, dictates a correction rate of acceleration and deceleration of the motor speed. For example, in a preferred embodiment, every 5 milliseconds, the DC bus current Idc is sampled to determine whether any change in frequency and voltage of the set of motor drive signals 77 is indicated. Accordingly, the frequency of motor drive signals 77 is incremented or decremented by a constant amount in each control process cycle. The amount of increment or decrement is preferably determined by dividing the frequency output range (Fbase) by the response time tr. For example, with 5 ms response time tr, Fbase is incremented or decremented from 0 Hz to 60Hz in a 0.005 Hz steps. If tolerated by motor 25, other algorithms that employ variable increment sizes in frequency adjustment may also be employed to more quickly bring motor 25 toward target torque or speed.

Figure 10:
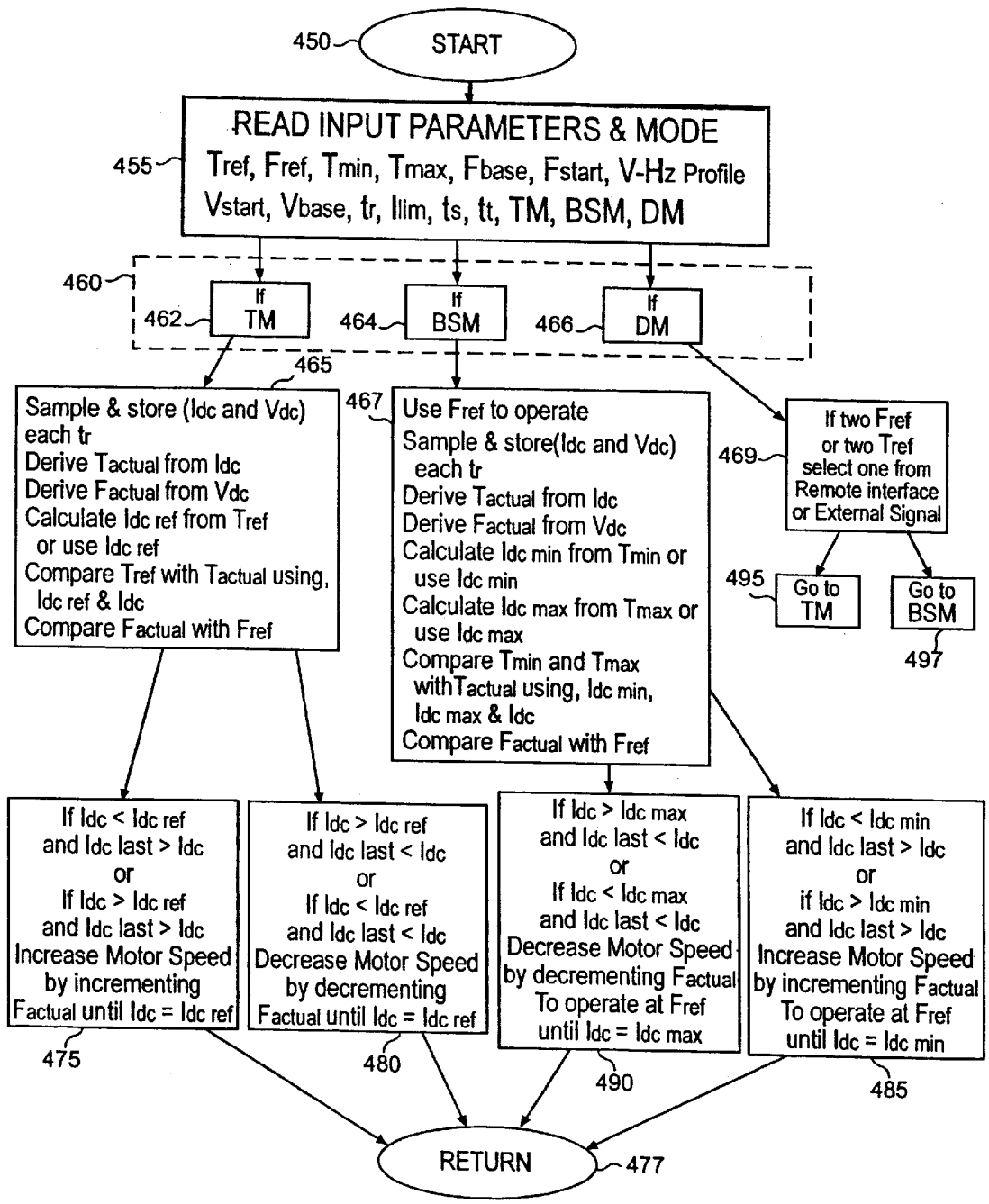
FIG. 10 depicts a flow chart showing a method for controlling motor speed of motor driving a cyclic load in an embodiment of a motor drive control system of the present invention.

FIG. 10 depicts a flow chart showing the steps of a method for controlling the speed of motor 25 driving cyclic load 30 in a preferred embodiment of the present invention. The articulated steps are not in any particular order. Step 450 represents the starting point for the control process. At step 455, control circuit 45 accesses and reads motor parameters, control parameters, measured parameters, and control modes.

At step 460, control circuit 45 determines the selected control mode. If the desired control mode is a torque mode (TM) 462, indicating regulated "constant torque" mode operation for motor 25, control circuit 45 advances to step 465. When a base speed mode (BSM) 464 is commanded, indicating regulated "constant speed" mode operation for motor 25, control circuit 45 advances to step 467. When the selected mode is a dual mode (DM) 466, indicating "dual" mode operation for motor 25, control circuit 45 advances to step 469.

At process block 465, in torque mode (TM) 462, signal measuring circuit 40 measures Idc and Vdc by periodic sampling of DC bus 60 according to the response time, tr, and stores the measured magnitudes in memory circuit 130.

Actual motor torque Tactual is derived from the DC bus current Idc. Actual frequency of the set of motor drive signals 77 Factual is derived from Vdc. Idcref is calculated from Tref if DC current value, Idcref, is not provided. Tactual is compared with Tref using Idcref and Idc. Factual is compared with Fref. Control process proceeds to step 475. If Idc is determined to be less than Idcref and Idclast (value of Idc stored in immediate previous iteration of the control sequence) is greater that Idc, then increase motor speed by incrementing Factual until Idc reaches Idcref and then return 477 to loop again until either total time tt is exhausted or commanded to stop. If Idc is determined to be greater than Idcref and Idclast (value of Idc stored in the immediate previous iteration of the control sequence) is less that Idc (as indicated in process block 480), then decrease motor speed by decrementing Factual until Idc reaches Idcref and then return 477 to loop again until either total time tt is exhausted or commanded to stop.

At step 467, in base speed mode (BSM) 464, signal measuring circuit 40 measures Idc and Vdc by sampling DC bus 60 during response time, tr, and logs the measured magnitudes in memory circuit 130. Actual motor torque Tactual is derived from the DC bus current Idc. Actual frequency, Factual, of the set of motor drive signals 77 is derived from Vdc. Idcmax and Idcmin are calculated from Tmax and Tmin, respectively, if DC current values, Idcmax and Idcmin, are not provided. Tactual is compared with Tmax using Idcmax and Idc or with Tmin using Idcmin and Idc. Factual is compared with Fref. As shown in process block 485, if Idc is determined to be less than Idcref and Idclast (value of Idc stored in immediate previous iteration of the control sequence) is greater that Idc, then motor 25 is operated at Fref by increasing motor speed with incrementing Factual until Idc reaches Idcmin and then return 477 to loop again until either total time tt is exhausted or commanded to stop. As shown in process block 490, if Idc is determined to be greater than Idcref and Idclast (value of Idc stored in immediate previous iteration of the control sequence) is less that Idc, then motor 25 is operated at Fref by decreasing motor speed with decrementing Factual until Idc reaches Idcmax and return 477 to loop again until either total time tt is exhausted or commanded to stop.

At step 469, in dual mode (DM) 464, since two different values of Fref, indicating dual speed mode or two different values of Tref (Idcref), indicating dual torque mode are provided, one is selected. One value of Fref can be selected in response to a speed select signal from user interface circuit 55 or remote interface 105 to proceed to step 495 and subsequently run step 462. Likewise, if in dual torque mode, one value of Tref can be selected in response to a torque select signal from user interface 55 or remote interface 105 to proceed to step 497 and subsequently run step 464.

Figure 11:
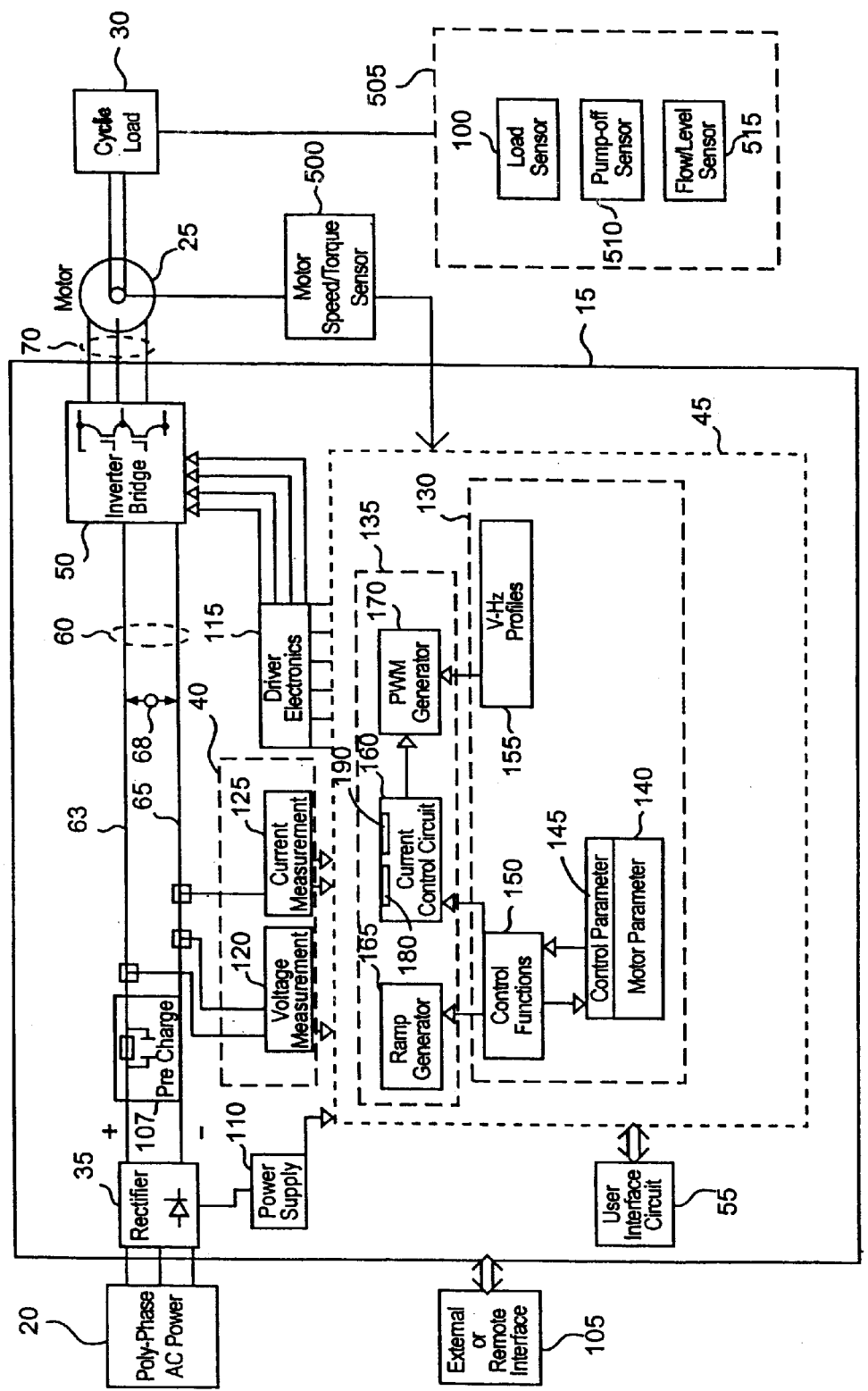
FIG. 11 illustrates an alternate embodiment of the present invention.

FIG. 11 illustrates an alternate embodiment of the present invention. Additional sensors are provided for beam-pumping unit 200 including a set of motor speed and torque sensors 500 and a set of beam-pump monitor sensors 505. The set of beam-pump monitor sensors 505 comprises load sensor 100, pump-off sensor 510 and flow-level sensor 515.

In this alternate embodiment, variation in pump cycle speed by varying the average number of pump strokes per minute in beam-pumping unit 200 can be allowed. Further, control system 10 can be programmed to decrease average speed during high loads and increase average speed during low loads. This speed variation substantially reduces mechanical loading and provides an increase in operational efficiencies, thereby reducing power consumption. As an example, the average stroke speed can be varied to match the oil well's productivity. This significantly reduces mechanical stress, reduces energy consumption and increases production. Control system 10 of the present invention can be programmed to vary the upstroke speed relative to the downstroke speed to further increase system efficiency. For example, the upstroke and downstroke speeds can be programmed to minimize mechanical loading. To reduce energy usage in a typical oil or gas pump system, the cycle speed of beam-pumping unit can be controlled by monitoring and subsequent adjustment of the pumping rate-pump strokes per minute, to match the oil well's instantaneous production level.

In another alternate embodiment, programmable control system 10 can be provided for monitoring a set of operational parameters to control cycle speed of beam-pumping unit 200 within pump stroke cycle 257 to match the pump speed to one or more operational parameters. VDS 15 operates on motor 25 to increase oil well productivity and provides substantial energy savings by allowing the motor speed to be matched to the operational parameters. For example, operational parameters such as instantaneous production level of an oil well can be matched to the motor speed, while maintaining the desired output cycle speed characteristics for beam-pumping unit 200. VDS 15 monitors the pump cycle speed and accordingly adjusts the motor speed when cyclic load 30 varies in various operating modes such as during a typical pump stroke cycle including startup, initial upstroke and downstroke in a typical pump stroke cycle.

By selectively controlling the pump cycle speed, control system 10 can significantly reduce energy consumption of an oil or gas pump system such as Pump Jacks. Because a typical regeneration process is avoided, the present system and method is highly effective in terms of horsepower requirement and overall reduction in energy usage. Importantly, wear and tear on motors and pump systems is significantly reduced because there is no longer any need to mechanically throttle the pumping process to control the pump speed, thereby leading to a significant reduction in maintenance costs of the equipment.

The present invention can allow for a method of soft starting beam-pumping unit at a reduced frequency and voltage to motor 25. Upon startup, VDS 15 delivers a reduced frequency and voltage to motor 25 to minimize the starting DC current Idc. A voltage boost can also be appropriately provided for starting motor 25. VDS 15 can increase frequency to motor 25 to maintain the desired torque setting Tref. By changing frequency to the set of motor drive signals 77, motor 25 can maximize pump fillage and operate at peak efficiency by reducing regeneration and minimizing strokes per minute (SPM) for maximum production. For "Pump Off" control, the frequency of motor drive signals 77 can be selectively varied to maintain maximum production by varying an average pump stroke speed to match the pump off controller where a pump off signal can be analog or digital. Increases or decreases in the average pump stroke speed can be accomplished by increasing or decreasing set speed Fref or torque setting Tref or combination of both. The torque setting Tref can be derived from DC motor current Idc, AC power input to motor 25 or from any type of load cell.

"Pump Off" protection for reciprocating pumps can be provided by operating in the torque mode or torque limit. A desired intake pressure may be obtained. As an oil well is pumped, the fluid level in a casing is reduced. This reduction in fluid level reduces the intake pressure to the pump. The differential pressure increases resulting in more energy to produce the fluid to the service. This increased energy can be measured in torque. If the fluid level is high, the unit will operate at higher SPM. As the fluid level is reduced, the unit will slow in SPM until the set torque is achieved. This results in a set fluid level based upon torque (energy).

"Pump Off" protection for P.C. pumps may be achieved by operating in a constant torque mode. The PC pump will slow (reduce frequency) as the fluid level in the oil well is reduced. If the torque is set too high, the fluid level will go below the desired level and pump off will occur. Upon initial pump off, the torque will be reduced due to the fact that there is no fluid to move the service. This lack of fluid will increase stator heating and cause the rubber to expand and increase torque. By monitoring the torque and frequency, pump off protection can be accomplished. Frequency will decrease as the fluid level is reduced. Upon an increase of frequency, pump off is established. The unit is turned off for a preset amount of time and then turned back on. An operator may manually or electronically slow the PC pump to operate for longer periods of time before shutting down.

In another alternate embodiment, control system 10 comprises a microprocessor based, keypad programmable, variable speed AC motor drive. The variable speed AC motor drive includes an input diode bridge and a filter with capacitors, a power board, a control board, and an output intelligent power module. Incoming AC line voltage is converted to a pulsating DC voltage by the input diode bridge. The DC voltage is supplied to the bus filter capacitors through a charge circuit that limits current to the capacitors during power-up. The pulsating DC voltage is filtered by the bus capacitors, which reduces ripple. The filtered DC voltage enters the inverter section of the drive, composed of six output intelligent insulated gate bipolar transistors (IGBT's) which make up the three output legs of the drive. Each leg has one intelligent IGBT connected to the positive bus voltage and one connected to the negative bus voltage. Alternately, switching on each leg, the intelligent IGBT produces an alternating voltage on each of the corresponding motor windings. By switching each output intelligent IGBT at a very high frequency (known as the carrier frequency) for varying time intervals, the inverter is able to produce a smooth, three phase, sinusoidal output current wave which optimizes motor performance.

The control section consists of a control board with the microprocessor, the keypad and a display. Drive programming is accomplished via the keypad or the serial communications port. During operation, the drive can be controlled via the keypad, by control devices wired to the control terminal strip, or by the serial communications port. The Power Board contains the control and protection circuits that govern the six output IGBT's. The Power Board also contains a charging circuit for the bus filter capacitors, a motor current feedback circuit, a voltage feedback circuit, and a fault signal circuit. The drive has several built in protection circuits. These include phase-to-phase and phase-to-ground short circuit protection, high and low line voltage protection, protection against excessive ambient temperature, and protection against excessive output current. Activation of any of these circuits will cause the drive to shut down in a fault condition. The drive can be programmed to indicate various conditions. For example, RUN, FAULT, INVERSE FAULT, FAULT LOCK, AT SPEED, ABOVE SPEED, CURRENT LIMIT, or AUTO/MAN.

Although the present invention and its advantages have been described in detail, it should be understood that various changes, substitutions and alterations can be made herein without departing from the spirit and scope of the invention as defmed by the appended claims. Moreover, the scope of the present application is not intended to be limited to the particular embodiments of the process, machine, manufacture, means, methods and steps described in the specification. As one of ordinary skill in the art will readily appreciate from the disclosure of the present invention, processes, machines, manufacture, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, means, methods, or steps.

We claim:

1. A system for controlling the speed of an AC electric motor connected to a cyclical load, the system comprising:
    a signal conversion circuit to convert an AC electric signal to a DC electric signal;
    a signal measurement circuit sampling the DC electrical signal and deriving a DC electric characteristic signal corresponding to a motor attribute in response thereto;
    a control circuit having a DC current signal stored thereon, the controlicircuit deriving a reference signal in response to a set point parameter and comparing the DC electric characteristic signal and the DC current signal with the reference signal to generate control signals in response thereto; and
    a signal inversion circuit to generate drive signals in accordance with the control signals that modify the speed of the AC electric motor in response to indicated changes in the motor attribute to corresponds to the set point parameter.

2. The system of claim 1 in which the signal measurement circuit samples the DC electric signal at a selected sampling frequency to derive the DC electric characteristic signal.

3. The system of claim 1 in which the motor attribute is representative of a change in motor voltage resulting from a change in motor load presented by the cyclic load as it is moved by the motor.

4. The system of claim 1 in which the motor attribute is representative of a change in motor current resulting from a change in motor load presented by the cyclic load as it is moved by the motor.

5. The system of claim 1 in which the motor attribute is representative of a change in motor voltage resulting from a change in motor load presented by the cyclic load as represented by a load profile.

6. The system of claim 1 in which the motor attribute is representative of a change in motor current resulting from a change in motor load presented by the cyclic load as represented by a load profile.

7. The system of claim 1 wherein the set point parameter is a torque set point and wherein the reference signal is a torque reference signal such that the torque reference signal is used to generate the control signals being representative of a determined adjustment to a dimension of the drive signals generated by the signal inversion circuit to selectively drive the motor.

8. The system of claim 7 in which the dimension of the drive signals is frequency.

9. The system of claim 7 in which the dimension of the drive signals is voltage.

10. A method for controlling speed of a variable drive system driven AC electric motor connected to a cyclic load, the method comprising the step of:
    converting an AC electric signal to DC electric signal deriving a set of DC electric characteristic signals from the DC electrical signal;

generating first and second sets of control signals in response to the set of DC electrical characteristic signals store DC current signal and a set point parameter; and inverting the DC electric signal in response to the first and second sets of control signals to generate a set of drive signals to modify the speed of the AC electric motor in response to indicated changes in the motor attribute to correspond to the set point parameter.

11. The method of claim 10 in which the step of deriving the set of DC electric characteristic signals from the DC electric signal further comprises the step of:

sensing the DC electric signal at a selected sampling frequency having a time period to produce the set of DC electric characteristic signals which includes a DC current signal and a DC voltage signal.

12. The method of claim 11 in which the step of generating first and second sets of control signals further comprises the step of:

deriving a first reference signal from the set operational parameters.

13. A method for controlling speed of an AC electric motor connected to a cyclic load, the method comprising the steps of:

converting with a signal conversion circuit an AC electric signal to a DC electric signal;

deriving with a signal measurement circuit a set of characteristic signals from the DC electric signal;

generating with a control circuit first and second sets of control signals in response to the set of DC electric characteristic signals and a set of operational parameters, a voltage-frequency profile, and a set point parameter; and inverting with a signal inversion circuit the DC electric signal in response to the first and second sets of control signals to generate a set of drive signals to modify the speed of the AC electric motor.

14. A variable drive system for controlling speed of an AC electric motor connected to a cyclic load, the system comprising:

a signal conversion circuit electrically connected to an alternating current source to convert a poly-phase AC power input from the alternating current source to a source of DC power on a DC bus;

a user interface circuit to receive a selected set of operational parameters, a selected voltage-frequency profile, and a selected torque set point;

a signal measurement circuit communicatively coupled to the control circuit for sensing DC current and voltage across the DC bus to provide a set of DC electric characteristic signals;

a control circuit responsive to the selected set of operational parameters, the selected voltage-frequency profile, the torque set point, and the set of DC electric characteristic signals, the control circuit generating a set of control signals to modify the speed of the AC electric motor according to a selected motor speed characteristic for different portions of a cycle of the cyclic load; and a signal inversion circuit electrically coupled to the DC bus and the AC electric motor to generate a set of variable frequency and variable voltage motor drive signals responsive to the set of control signals.

15. A system for controlling the speed of an AC electric motor connected to a cyclical load, the system comprising:

a signal conversion circuit to convert an AC electric signal to a DC electric signal;

a signal measurement circuit to derive from the DC electrical signal, a DC electric characteristic signal corresponding to a motor attribute;

a control circuit responsive to the DC electric characteristic signal and target torque range, the control circuit deriving a speed reference signal and using the speed reference signal to derive control signals; and a signal inversion circuit to generate drive signals in accordance with the control signals that modify the speed of the AC electric motor in response to indicated changes in the motor attribute to correspond to the set point parameter wherein the control signals are representative of a determined adjustment to a dimension of the drive signals generated by the signal inversion circuit to selectively drive the motor.

16. A method for controlling speed of a variable drive system driven AC electric motor connected to a cyclic loads the method comprising the steps of:

converting an AC electric signal to a DC electric signal;

deriving a set of DC electric characteristic signals from the DC electrical signal, wherein the steps of deriving the set includes the step of sensing the DC electric signal at a selected sampling frequency having a time period to produce the set of DC electric characteristic signals which includes a DC current signal and a DC voltage signal; and generating first and second sets of control signals in response to the set of DC electric characteristic signals and a set point parameter; wherein the steps of generating the first and second sets includes the steps:

deriving a first reference signal from the set operational parameters;

storing the DC current signal magnitude and deriving a desired parameter signal from the sensed DC voltage signal and the voltage-frequency profile in each of the time period of the selected sampling frequency; and inverting the DC electrical signal in response to the first and second sets of control signals to generate a set of drive signals to modify the speed of the AC electric motor in response to indicated changes in the motor attribute to correspond to the set point parameter.

17. The method of claim 16 in which the step of generating first and second sets of control signals further composes the step of:

comparing the DC current signal with the first reference signal and the stored DC current signal magnitude and comparing the desired parameter signal with the second reference signal for modifying the speed of the AC electric motor.

18. The method of claim 17 in which the step of inverting the DC electric signal in response to the first and second sets of control signals to generate the set of drive signals further comprises the step of:

maintaining a substantially constant motor torque at the set point parameter indicative of constant torque by generating and selectively applying the set of drive signals to the AC electric motor.

19. The method of claim 18 in which the step of inverting the DC electric signal in response to the first and second sets of control signals to generate the set of drive signals further comprises the step of:

driving the AC electric motor at a progressively decreased speed while the DC current signal is greater than the previously stored magnitude of the DC current signal by modifying the frequency of the set of drive signals with the first set of control signals and modifying the voltage amplitude of the set of drive signals with the second set of control signals.

20. The method of claim 18 in which the step of inverting the DC electric signal in response to the first and second sets of control signals to generate the set of drive signals further comprises the step of:

driving the AC electric motor at a progressively increased speed while the DC current signal is less than the previously stored magnitude of the DC current signal by modifying the frequency of the set of drive signals with the first set of control signals and modifying the voltage amplitude of the set of drive signals with the second set of control signals.

21. A method for controlling speed of a variable drive system driven AC electric motor connected to a cyclic load, the method comprising the steps of:

converting an AC electric signal to DC electric signal;

deriving a set of DC electric characteristic signals from the DC electric signal;

generating first and second sets of control signals in response to the set of DC electric characteristic signals and a second point parameter; wherein the step of generating first and second sets of control signals includes the step of receiving the set of operational parameters, the voltage-frequency profile, and the set point parameter; and inverting the DC electric signal in response to the first and second sets of control signals to generate a set of drive signals to modify the speed of the AC electric motor in response to indicated changes in the motor attribute to correspond to the set point parameter.

22. A method of controlling speed of a variable drive system driven AC electric motor connected to a cyclic load, the method comprising the steps of:

converting an AC electric signal to a DC electric signal;

deriving a set of DC electric characteristic signals from the DC electric signal;

generating first and second sets of control signals in response to the set of DC electric characteristic signals and a set point parameter wherein the step of generating first and second sets of control signals includes the step of pre-loading the set of operation parameters, the voltage-frequency profile, and the set point parameter; and inverting the DC electric signal in response to the first and second sets of control signals to generate a set of drive signals to modify the speed of the AC electric motor in response to indicated changes in the motor attribute to correspond to the set point parameter.

23. The system of claims 15 in which the dimension of the drive signal is frequency.

24. The system of claim 15 in which the dimension of the drive signals is voltage.

25. The system of claims 15 in which the set point parameter is determined by evaluation of the motor driving the cyclic load in an unregulated mode.

* * * * *